US005907329A

United States Patent [19]

Nobutani et al.

[11] Patent Number: 5,907,329

[45] Date of Patent: May 25, 1999

[54] DISPLAY CONTROL APPARATUS, INFORMATION PROCESSING APPARATUS, AND CONTROL METHOD

[75] Inventors: Toshiyuki Nobutani, Yokohama; Masami Shimakura, Machida; Hajime Morimoto, Tokyo, all of Japan

[73] Assignee: Canon Kabushiki Kaisha, Tokyo, Japan

[21] Appl. No.: 08/603,712

[22] Filed: Feb. 20, 1996

[30] Foreign Application Priority Data

| | | | |
|---|---|---|---|
| Feb. 21, 1995 | [JP] | Japan | 7-032259 |
| Mar. 8, 1995 | [JP] | Japan | 7-048320 |

[51] Int. Cl.[6] ..... G06F 13/00

[52] U.S. Cl. ..... 345/511; 345/97

[58] Field of Search ..... 345/87, 97–98, 345/508, 511

[56] References Cited

U.S. PATENT DOCUMENTS

| | | | |
|---|---|---|---|
| 4,964,699 | 10/1990 | Inoue | 350/332 |
| 5,379,051 | 1/1995 | Suga et al. | 345/97 |
| 5,613,103 | 3/1997 | Nobutani et al. | 345/97 |

FOREIGN PATENT DOCUMENTS

| | | | |
|---|---|---|---|
| 5323905 | 12/1993 | Japan | G06F 15/72 |

*Primary Examiner*—Kee M. Tung
*Attorney, Agent, or Firm*—Fitzpatrick, Cella, Harper & Scinto

[57] ABSTRACT

It can be determined without visually observing the display screen of a display device whether image conversion processing in a conversion circuit for outputting image data to the display device is being performed normally. The conversion circuit extracts data at a position designated from a host apparatus from image data output to the display device, and outputs the extracted data to the host apparatus. In the host apparatus, image data obtained upon normal conversion in the conversion circuit is prepared in advance, and this image data is collated with the data sent from the conversion circuit to determine whether the operation of the conversion circuit is normal.

34 Claims, 16 Drawing Sheets

DISPLAY CONTROL APPARATUS, INFORMATION PROCESSING APPARATUS, AND CONTROL METHOD

BACKGROUND OF THE INVENTION

The present invention relates to a display control apparatus, an information processing apparatus, and a control method.

In an information processing system (or apparatus), a display device is generally used as a means for realizing an information visual expression function. A CRT display device is most popular as such a display device, as is well known.

In display control in a CRT display device, an operation for writing an image to be displayed in a video memory (to be referred to as a VRAM hereinafter) arranged in an information processing apparatus and an operation for reading out display data from the VRAM are independently performed.

In the above CRT display control, write access of display data to the video memory to update display information and read access for displaying display information are performed independently of each other. For this reason, desired display data can be advantageously written at an arbitrary timing without considering the display timing in the program on the information processing system side.

The number of display dots on a display device in an information processing apparatus such as a personal computer is generally 640×400 to 640×480 dots. The number of display colors is a maximum of 16 in most display devices.

Along with recent advance in OS's (Operating Systems) and hardware, it is now possible to mount a display board or card on an existing information processing apparatus so as to increase not only the number of display dots but also the number of colors. The display board or card is a so-called graphic accelerator board (card) (to be referred to as a display control board hereinafter). Liquid crystal displays (LCD) have recently received a great deal of attention as substitutes for existing CRT devices because the LCD takes less space.

In the liquid crystal display, the number of colors is generally smaller than that of the CRT. Therefore, image data to be displayed on the LCD must be processed to some extent, and the processing result must be displayed.

For example, the assignee of the present invention has proposed a display using a ferroelectric liquid crystal cell (this display will be referred to as an FLCD hereinafter) as one type of LCD. One of the features of the FLCD lies in that a liquid crystal cell can retain its display state even after removal of an electric field. More specifically, the FLCD has a sufficiently thin liquid crystal cell, and each elongated FLC element in the cell maintains its aligned state even upon removal of the applied electric field. The FLCD using this FLC element has a memory effect for storing display contents due to the bistable properties of the FLC element. The details of the FLC and FLCD are described in U.S. Pat. No. 4,964,699.

The number of colors of the FLCD is 16 at present. However, binarization techniques such as error diffusion can greatly increase the apparent number of display colors.

When a graphic accelerator board for a liquid crystal display such as an FLCD as an output target is taken into consideration, at least a circuit for converting display data into data to be displayed on a liquid crystal display is required.

To check if such a circuit operates properly, the board is connected to an FLCD (this FLCD is, of course, one that has been confirmed as operating properly), a sample image is displayed, and it is determined by observation with the human eye whether any defective portion is present. This operation is time-consuming and requires much labor of those who test the graphic accelerator boards.

To drive an FLCD, since a display image is stored beforehand and displayed, unlike in a CRT or other liquid crystal displays, a time margin is formed in the continuous refresh driving period. As a result, so-called partial rewrite driving for updating only the display state of an updated portion on the display screen independently of the continuous refresh driving can be performed.

In the FLCD, binarization halftone processing is performed to increase the number of pseudo display colors. A typical example is an ED (Error Diffusion) method for maintaining the image qualities of both a natural image and a character image. This ED processing requires continuity of an image in processing because an error occurring in a given pixel is sequentially diffused (distributed) to adjacent pixels.

The following problem is posed when processing using the ED method and the partial rewrite processing is to be simultaneously performed.

More specifically, as described above, according to the ED method, an error occurring in the process propagates like a wave, so that an image as a processing target must be continuous. If some updated portions are present, these portions become discrete in the vertical direction.

To immediately reflect the ED processing result on the FLCD, the transfer rate of the ED processing result must be equal to that of the FLCD. In this case, the partial rewrite position is not fixed, but may be an arbitrary position on the display screen. To cope with this by directly transferring the ED processing result to the FLCD, some technical problems are left unsolved.

SUMMARY OF THE INVENTION

The present invention has been made in consideration of the conventional problems described above, and has as its object to provide a display control apparatus, an information processing apparatus, and a control method, all of which can obtain converted image data corresponding to a display and preclude the need for visual check.

In order to achieve the above object, a display control apparatus according to the present invention has, for example, the following arrangement. That is, a display control apparatus for performing display control of a display comprises:

first memory means for storing original image data of a display image;

second memory means for storing data in a display format of the display;

conversion means for converting the image data stored in the first memory means into a data format corresponding to the display and outputting the converted data to the second memory means; and output means for outputting at least part of the data transferred from the second memory means to the display to a host apparatus in accordance with a predetermined instruction from the host apparatus.

According to a preferred embodiment of the present invention, the display preferably has storage retention characteristics of display contents, and is particularly preferably a ferroelectric liquid crystal display.

The image transferred from the second memory means to the display can be located at an arbitrary position, and a display image in the transferred image does not become unnatural.

The instruction from the host apparatus for the image transferred to the display preferably includes a line address and a position address based on the unit of transfer. Therefore, image data at a desired position can be obtained.

The host apparatus is a general-purpose image processing apparatus. The display control apparatus is preferably connected to an expansion bus arranged in the general-purpose information processing apparatus. Therefore, the display control apparatus is not limited to use with a dedicated information processing apparatus but can be used together with a general information processing apparatus.

The present invention has been made in consideration of the conventional problems described above, and has as its another object to provide a display control apparatus, an information processing apparatus, and a control method, all of which can display an image on a display having display image storage retention characteristics at a high response speed.

In order to achieve the above object, a display control apparatus according to the present invention has, e.g., the following arrangement. That is, a display control apparatus adapted to be connected to a display having display image storage retention properties comprises:

first memory means for storing original image data of a display image;

second memory means for storing data in a display format of the display;

monitor means for monitoring access to the first memory means;

conversion means for converting image data in a written area into a display data format of the display when write access to the first memory means is detected by the monitor means;

storage means for storing the converted image data in the second memory means;

determination means for determining whether a non-output image to the display is left in the second memory means; and output means for outputting a non-output image to the display when the determination means determines that the non-output image is left in the second memory means.

According to a preferred embodiment of the present invention, the second memory means has a capacity corresponding to the entire frame displayed on the display. The apparatus preferably further has second output means for outputting all the images stored in the second memory means to the display when the determination means determines that no non-output image is left in the second memory means. Therefore, even if an image which is not rewritten remains, it is refreshed to maintain good image quality.

According to another preferred embodiment of the present invention, the second output means preferably performs interlaced scanning of an image stored in the second memory means and outputs the interlaced image to the display. Therefore, even if the display speed of the display is slightly low, the entire frame can be quickly updated.

According to still another preferred embodiment of the present invention, the display control apparatus is preferably connected to an expansion bus arranged in a general-purpose information processing apparatus. The general-purpose information processing apparatus uses and utilizes the display capable of storing and retaining the display image.

The display is preferably a ferroelectric liquid crystal display, thereby greatly enhancing the above operation and effect.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

The preferred embodiments of the present invention will be described with reference to the accompanying drawings.

Arrangement of Information Processing System

Figure 1:
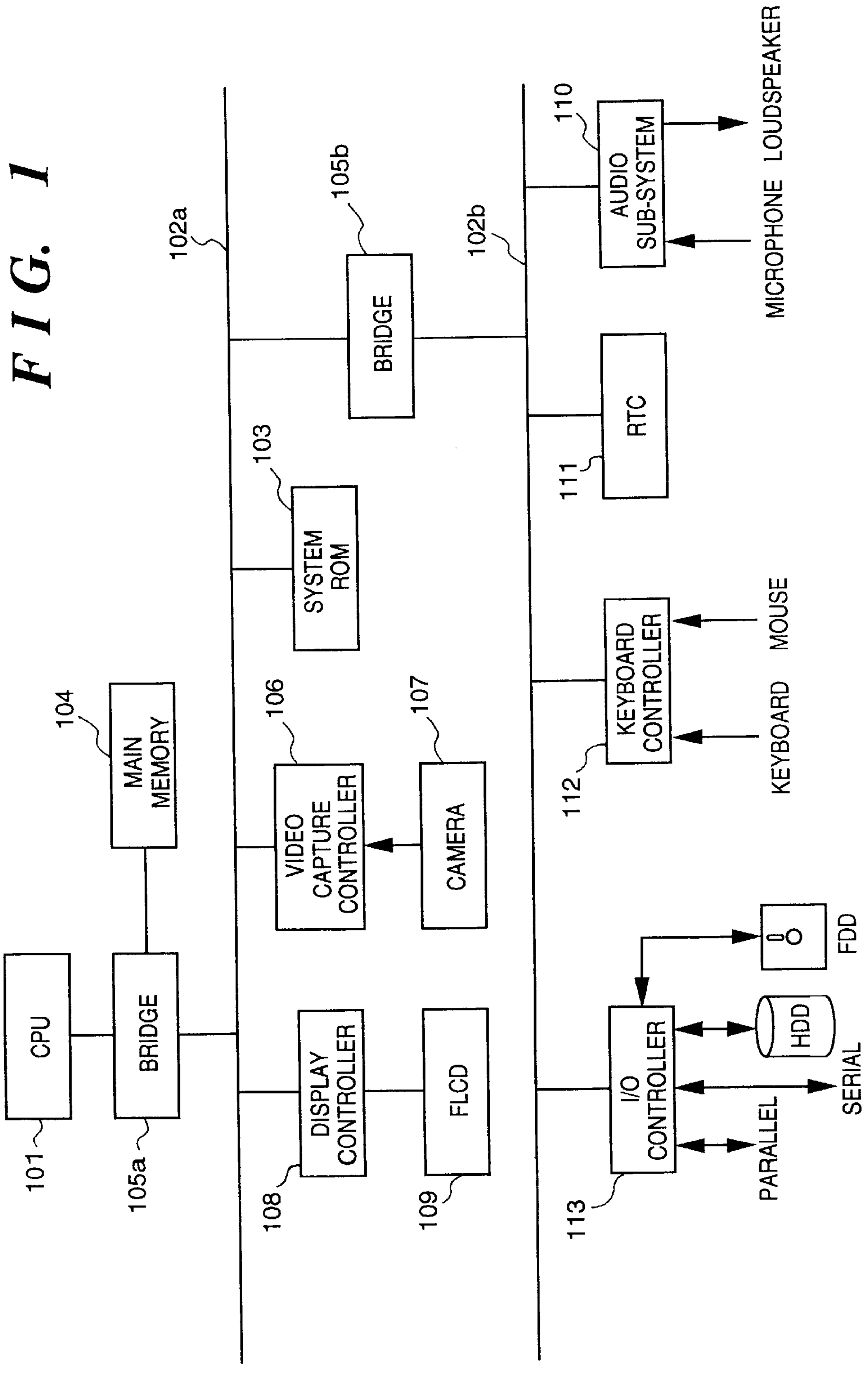
FIG. 1 is a block diagram showing an information processing system according to an embodiment.

Referring to FIG. 1, reference numeral 101 denotes a CPU for controlling the overall information processing system; 102*a*, a bus (e.g., a PCI bus) which can perform high-speed transfer and includes an address bus, a control bus, and a data bus; 102*b*, a middle-speed bus for performing data transfer, which is not faster than that of the bus 102*a*; and 103, a system ROM storing a boot program, a BIOS, and the like. Reference numeral 104 denotes a main memory consisting of a RAM in which the OS and various application programs are loaded. Reference numerals 105*a* and 105*b* denote bridges for performing arbitration between different buses. Reference numeral 106 denotes a video capture controller which serves as a circuit to capture a video output from a video camera 107 or the like to the apparatus.

Reference numeral 108 denotes a display controller serving as the main part of this embodiment. The display controller 108 converts input data into an image to be displayed on an FLCD 109 (the display controller 109 and the FLCD 108 will be described in detail later).

Reference numeral 110 denotes an audio sub-system for sampling a signal from a sound source such as a microphone and converting it into digital data. The audio sub-system 110 also converts digital data into an analog signal which is then output from a loudspeaker.

Reference numeral 111 denotes a quartz oscillator which serves as a real-time clock having a timepiece function; and 112, a keyboard controller for receiving a key input signal from a keyboard and an input signal from a pointing device and transmits them to the CPU 101.

Reference numeral 113 denotes an I/O controller which comprises a floppy disk drive (FDD), a hard disk drive (HDD), a serial interface, and a parallel interface, as shown in FIG. 1. The I/O controller 113 can connect a general-purpose apparatus. The HDD stores the OS (Operating System) and various application programs of the system of this embodiment.

Note that a display RAM (VRAM) and circuits for processing images stored in the VRAM into data to be displayed on the FLCD 109 are included in the display controller 108. The display controller 108 may be permanently connected to the system, or may be connected as a card (or board) mounted in an expansion slot formed in an information processing apparatus generally represented by a workstation or personal computer. More specifically, the FLCD 109 and the display controller 108 of this embodiment may be incorporated in the system in any form, or may be connected as independent external devices. Note that when the FLCD 109 is arranged separately form the information processing apparatus, the FLCD 109 is connected to the display controller 108 through a cable.

In any case, the OS and an application program are loaded in the memory 104 through the I/O controller 113 in the system of this embodiment and are executed. Image information under execution is stored in the VRAM arranged in the display controller 108 and is displayed on the FLCD 109. Note that any OS and any application program can be used. For example, MS-WINDOWS (available from Microsoft) is available as an OS, and any application program which runs on this OS can be used.

As previously described, when the system of this embodiment is a personal computer or the like, and the display controller 108 is connected to its general-purpose slot, an image must first be written in the VRAM in the controller 108. This processing is performed by activating an FLCD device driver (a kind of software) stored in the HDD or the like.

Description of Image Data Flow

Figure 2:
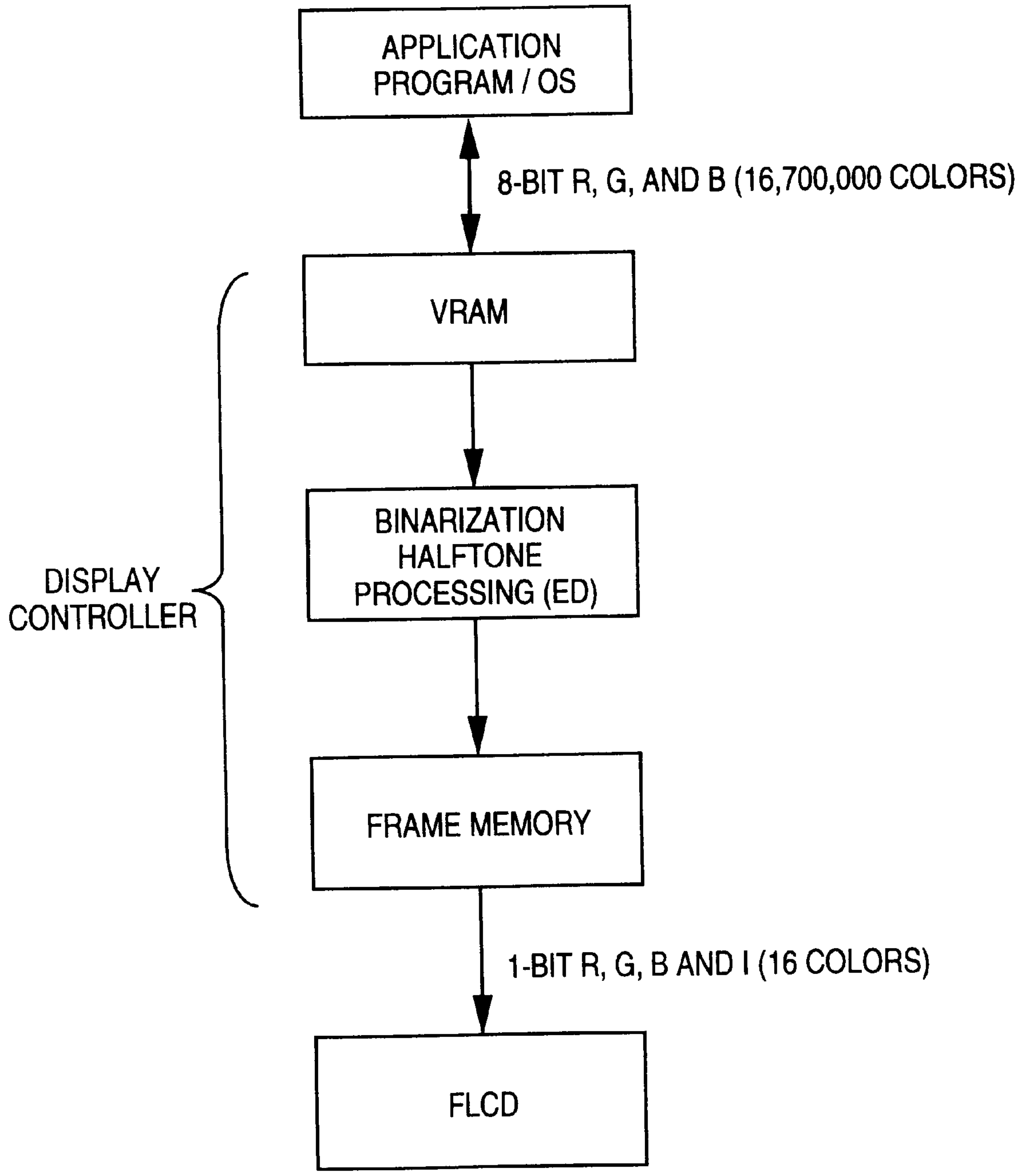
FIG. 2 is a diagram showing the concept of a data flow associated with an image display in the system of the embodiment shown in FIG. 1.

The concept of a data flow associated with an image display in the system of this embodiment is shown in FIG. 2.

When an application program or OS performs write access to the VRAM in the display controller 108, the written data is subjected to binarization halftone processing (error diffusion (ED) processing in this embodiment). The processed data is written in a frame memory (each pixel of 4 bits=R, G, B, I) having a capacity corresponding to one frame of the FLCD 109. The contents of this frame memory are transferred to the FLCD 109 and displayed. In a general display device, the contents of the VRAM are directly transferred to the display device. However, the frame memory is interposed between the VRAM and the FLCD 109 serving as the display in the display controller 108 of this embodiment.

Description of Display Controller and FLCD

Figure 3:
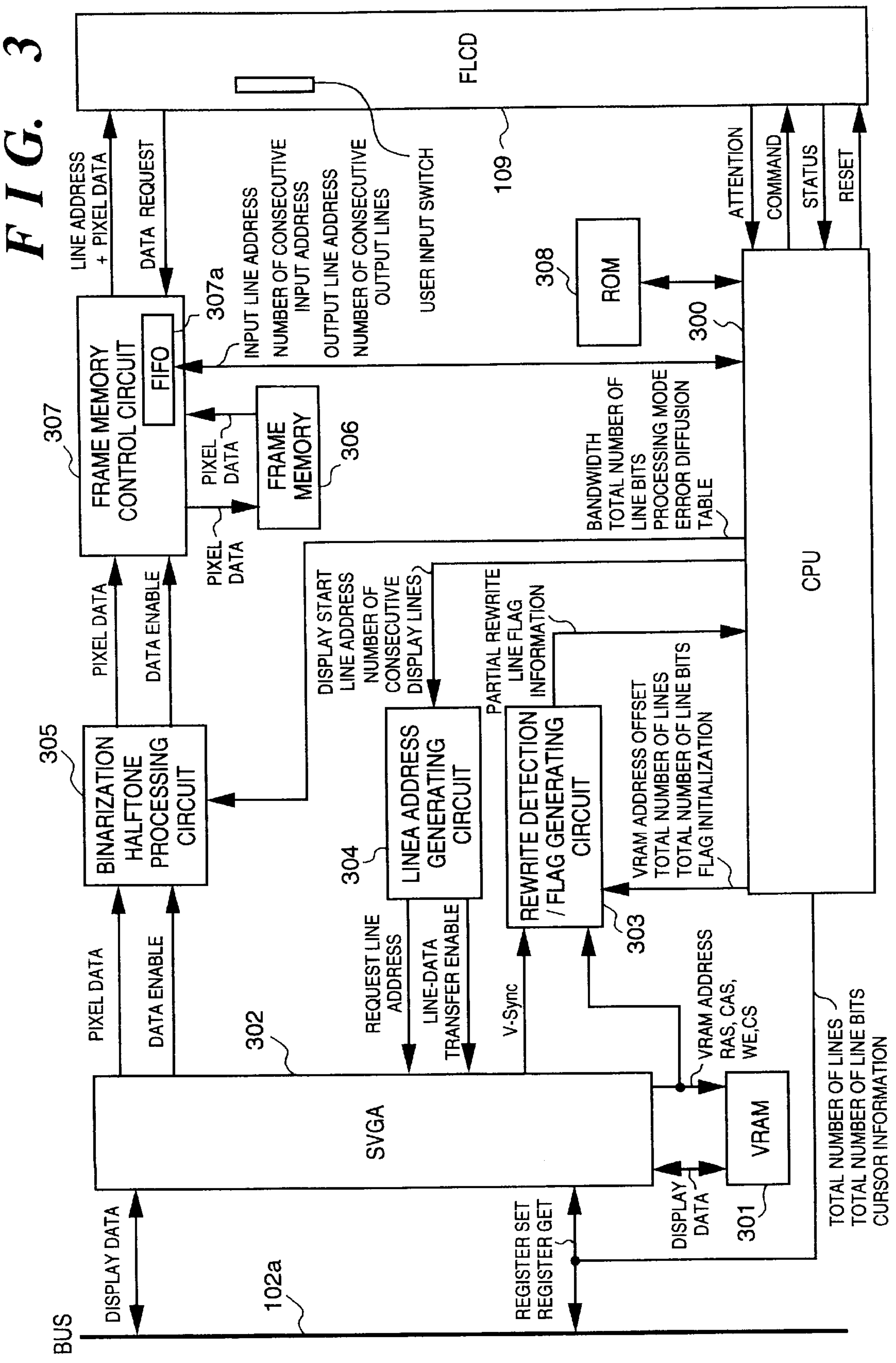
FIG. 3 is a block diagram showing the detailed arrangement of a display controller of the embodiment shown in FIG. 1.

FIG. 3 is a detailed block diagram of the display controller 108 in this embodiment.

Referring to FIG. 3, reference numeral 300 denotes a CPU arranged in the display controller 108 to control the overall display controller. This CPU 300 operates in accordance with programs stored in a ROM 308.

Reference numeral 301 denotes a VRAM in which one byte (8 bits) is assigned to each of R, G, and B per pixel (a total of three bytes=24 bits=about 16,700,000 colors). When eight bits are assigned to each of the R, G, and B color components, a color image reproduced under this assumption is called a full-color image. In this embodiment, the VRAM 301 has a capacity which can store an image having a size of 1,280×1,024 dots (i.e., 1,280×1,024×3≅4 Mbytes).

Reference numeral 302 denotes an SVGA for controlling access to the VRAM 301. The SVGA 302 can draw (write) data in the VRAM 301 or read out data from the VRAM 301 on the basis of an instruction from the CPU 101 on the information processing system side. The SVGA 302 also has a function of drawing a figure or the like on the basis of an instruction from the CPU 101 and other functions to be described later. Note that an LSI for drawing various figures in the VRAM is widely used as a display control chip and is known well.

Reference numeral 303 denotes a write detection/flag generation circuit. When the SVGA chip 302 performs write access (drawing) to the VRAM 301, a write enable signal (actually including a chip select signal) is used as a trigger pulse to detect the write address, calculate the updated line number, and hold this information.

More specifically, using a write enable signal generated when the SVGA chip 302 performs write access to the VRAM 301, the circuit 303 latches the corresponding output address in a register (not shown). The circuit 303 then calculates the number of a line having undergone write access from the latched address data (this can be calculated by a circuit for dividing the write address by the number of bytes of one line). The circuit 303 then sets "1" in the area flag corresponding to the rewritten line. In this embodiment, the number of lines of the entire screen of the FLCD 109 is 1,024 (0th line to 1023rd line), and each area is set in units of 32 lines. The total number of bits assigned to the area flag portion is 32 (=1,024/32). More specifically, the respective bits in the 32-bit flag portion hold information as to whether write access is made to the areas of 0th to 31st lines, 32nd to 63rd lines, . . . , and 992nd to 1023rd lines.

Information concerning rewriting is held not in units of lines but in units of several lines, for the following reason. A display image change generally concerns not one line but often influences a plurality of lines. Note that the number of lines assigned to one area is not limited to 32, but may be any arbitrary number. However, when the number of lines is excessively small, the number of bits of the area flag portion undesirably increases. The number of partial rewrite instructions (to be described later) also increases with an increase in the number of bits of the area flag portion, thereby increasing the overhead amount. However, when the number of lines to be assigned is excessively large, the number of lines not requiring partial rewrite may undesirably increase. Therefore, the number of lines assigned to one area is determined to be 32.

The maximum resolution of the FLCD 109 is 1,280×1,024 as will be described in detail later. However, to allow display operations at different numbers of dots (e.g., 1,024×768 or 640×480), the information volume of one line is programmable so as to calculate the rewrite line number. A change in the number of display dots is based on an instruction from the CPU 102 on the information processing apparatus side (the currently running program is the control driver of the display controller in this embodiment).

When the rewrite detection/flag generation circuit 303 detects that a rewrite operation is performed for an area of 32 lines written in the VRAM 301, the circuit 303 notifies the CPU 300 of the contents of this area flag. As will be described later, the rewrite detection/flag generation circuit 303 also clears the area flag to zero in response to a request from the CPU 300.

Reference numeral 304 denotes a line address generation circuit for receiving the start address of a line designated from the CPU 300, the number of offset lines from the designated line, and outputting data transfer address and its control signal to the SVGA chip 302. The SVGA chip 302 receives this address data and the control signal and outputs image data (R, G, and B each having 8 bits/pixel) of the number of lines designated from the corresponding line to a binarization halftone processing circuit 305 (to be described below).

The binarization halftone processing circuit 305 quantizes the image data (three 8-bit R, G, and B data per pixel) transferred from the SVGA chip 302 into R, G, and B signals and a intensity signal I (each signal has one bit, that is, a total of four bits) on the basis of an error diffusion method. A technique for binarizing an 8-bit R, G, or B signal into a 1-bit R, G, or B signal and generating a binary signal I representing the luminance level has already been proposed by the present applicant (e.g., Japanese Patent Application No. 4-126148 (corresponding to U.S. patent application Ser. No. 08/062,337)). The binarization halftone processing circuit 305 incorporates a buffer memory required to execute error diffusion processing.

Note that the binarization halftone processing circuit 305 receives an error diffusion table (parameters), an output line position, and the number of output lines, all of which serve as binarization parameters, on the basis of an instruction from the CPU 300, and outputs data on the basis of these parameters. The error diffusion table is not permanent, but can be arbitrarily set under the control of the CPU 300 due to the following reason. For example, the color arrangement or the like can be changed on the basis of an instruction from the CPU 101 on the information processing apparatus side.

Reference numeral 306 denotes a frame memory for storing an image (three 1-bit R, G, and B data per pixel) to be displayed on the FLCD 109. As previously described above, the FLCD 109 of this embodiment has a resolution of 1,280×1,024 dots. Each dot has 4 bits, so that the frame memory has a 1-Mbyte (640 Kbytes in the calculation) capacity.

Reference numeral 307 denotes a frame memory control circuit for controlling write access and read access to the frame memory and transfer of data to the FLCD 109. The details of the frame memory control circuit 307 will be described later. The frame memory control circuit 307 stores the R, G, B, and I data output from the binarization halftone processing circuit 305 in the frame memory 306 and outputs the area designated by the CPU 300 to the FLCD 109 (after one-line data is stored in a FIFO memory 307*a*, the stored data is transferred). Except that image data having a given number of lines is transferred to the FLCD 109 (i.e., transfer of image data whose transfer is designated by the CPU 300 is completed, and the next transfer instruction is absent), when a transfer request for last one-line image data is received from the FLCD 109, the frame memory control circuit 307 notifies the CPU 300 of this using an interrupt signal. Note that the data format in transfer to the FLCD 109 has a set of four bits, i.e., four 1-bit R, G, B, and I signals, and data is also stored in the frame memory 306 in this data format.

When storage of the image data from the binarization halftone processing circuit 305 in the frame memory 306 is completed, the frame memory control circuit 307 notifies the CPU 300 of this using an interrupt signal. Similarly, when transfer of image data of the line designated from the CPU 300 is completed (transfer of image data of a plurality of lines is completed upon designation of transfer of the plurality of lines), the frame memory control circuit 307 notifies the CPU 300 of this using an interrupt signal.

In the above arrangement, when the CPU 101 in the information processing apparatus receives a drawing request for a character or figure from the OS or an application program, the CPU 101 outputs a drawing command or image data to the SVGA chip 302 in the display controller 108. Upon reception of image data, the SVGA chip 302 writes this image at the designated location in the VRAM 301. Upon reception of a drawing command for figure data or the like, a figure image is drawn at the corresponding location in the VRAM 301. More specifically, the SVGA chip 302 performs write access to the VRAM 301.

As previously described, the rewrite detection/flag generation circuit 303 monitors write access of the SVGA chip 302. As a result, a flag for a written area is set, and the CPU 300 is notified of this operation.

The CPU 300 reads the area flag stored in the rewrite detection/flag generation circuit 303 and resets this area flag in the rewrite detection/flag generation circuit 303 to prepare for the next rewrite operation. Note that this reset operation may be performed using a hardware means for simultaneously performing the reset operation and the read operation.

The CPU 300 determines from the read area flag which bit is set, i.e., which area (or areas) has undergone the rewrite operation. To transfer the area determined to be rewritten from the VRAM 301 to the binarization halftone processing circuit 305, the CPU 300 outputs, to the line address generation circuit 304, the start address of the transfer start line (normally the address of the left corner on the screen) and data presenting the number of lines to be transferred from the transfer start line.

It should be noted that when, e.g., a write operation has been performed for the 10th area of the VRAM 301, i.e., an area of 320th to 351st lines, the address of the start pixel of the 320th line and an instruction for 32-line transfer from the 320th line are not set. Rather, transfer from the start pixel address of the line (315th line) 5 lines ahead of the 320th line is performed. That is, transfer of the 315th line to the 351st line is designated due to the following reason.

In general error diffusion processing, a two-dimensional matrix having weighting factor values (i.e., values representing the distribution ratio) is used to diffuse any generated errors to unprocessed pixels. Thus, generated errors sequentially propagate. Assuming two pixels A and B, the influence of an error generated upon binarization at the position of pixel A on the position of pixel B (unprocessed pixel) is considered. In this case, the influence of the error generated at pixel A on pixel B is smaller as the distance between pixels A and B is larger. In other words, when this distance is considerably large, the influence of the error from pixel A to the position of pixel B is negligibly small. The above five lines are determined on the basis of the above reason. A distance which renders the influence of an error negligible is determined depending on the size and weighting factor values of an error diffusion matrix. Error diffusion processing in the binarization halftone processing circuit 305 in this embodiment is performed from the upper left corner to the lower right corner of the image, as may be readily understood from the above description.

The CPU 300 outputs, to the binarization halftone processing circuit 305, an instruction representing a specific output portion of the line data of the processing result.

As previously explained, when a write operation is performed for the area of the 320th line to the 351st line of the VRAM 301, the data of the 315th line to the 351st line is transferred to the binarization halftone processing circuit 305. However, the CPU 300 outputs an instruction to output the data of the 320th line to the 351th line to the binarization halftone processing circuit 305.

As a result, the binarization halftone processing circuit 305 outputs, to the frame memory control circuit 307, the data of the 320th line to the 351th line which have received the influence of the non-changed portion before the 319th line.

On the basis of the instruction from the CPU 300, the frame control memory circuit 307 writes data (four bits/pixel) in units of lines output from the binarization halftone processing circuit 305 in the corresponding frame memory 306. More specifically, since the CPU 300 has detected the number of lines output from the binarization halftone processing circuit and the line number of the start line of these lines in the image, the CPU 300 sets the input line address (the write start address for the frame memory 306) and data representing the number of consecutive lines to the frame memory control circuit 307.

The frame memory 306 stores the rewritten (updated image) portion of the image and a joint portion between the written image and the nonwritten image as a natural image. Note that when data transfer from the binarization halftone processing circuit 305 to the frame memory 306 is completed for the area designated from the CPU 300, the frame memory control circuit 307 generates an interrupt signal as described above.

The processing speed of the binarization halftone processing circuit 305 in this embodiment is about 1/30 second for a frame at present. This processing speed is about half the frequency (about 60 Hz) of the vertical sync signal as in a CRT. However, the entire frame is rarely rewritten as long as an ordinary application program is used. In other words, the number of lines processed by the binarization halftone processing circuit 305 in practice is not so large. The period until completion of processing is almost equal to the display update period of the CRT with respect to the entire screen because the processing volume is small. If the portion to be rewritten is less than half the entire screen, the processing speed is higher than that of the CRT.

The frame memory control circuit 307 also receives an output instruction for the FLCD 109 from the CPU 300. The output instruction instructs to output the number of lines (consecutive lines) from a specific start line (i.e., the start address of the line) to the FLCD 109. Upon reception of this instruction, the frame memory control circuit 307 loads image data line by line from the frame memory to the FIFO memory 306*a* and transfers it to the FLCD 109. When a series of transfer operations are completed, the frame memory control circuit 307 outputs an interrupt signal representing the end of transfer to the CPU 300, as previously described.

Figure 6:
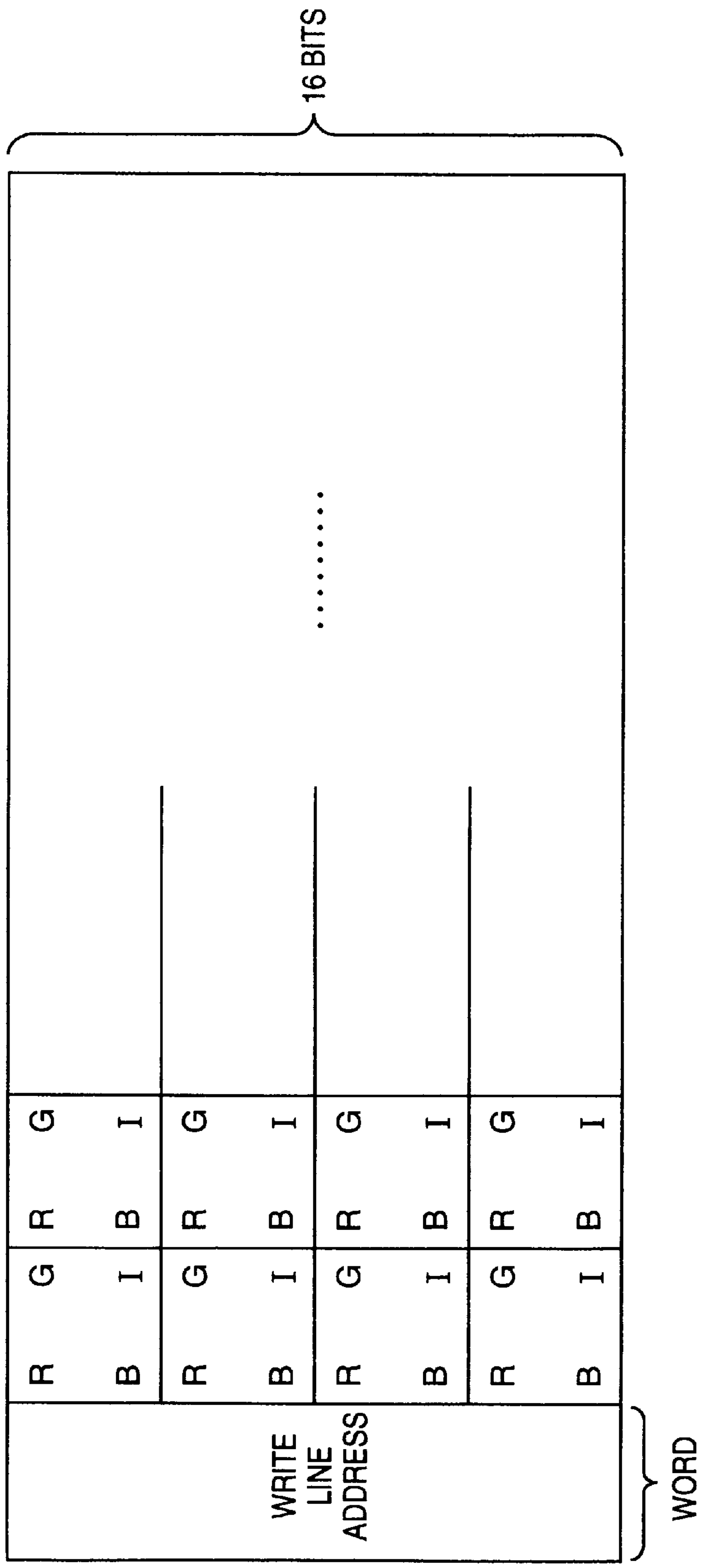
FIG. 6 is a table showing the format of data transferred to the FLCD in the embodiment shown in FIG. 1.

The data format used in transfer to the FLCD 109 under the control of the frame memory control circuit 307 is shown in FIG. 6. As shown in FIG. 6, data transfer in this embodiment is performed in units of 16 bits per word. The write line address is added to the beginning, and 4-pixel (4-pixel data contiguous in the horizontal direction) follows the write line address. The resultant data is transferred.

Upon reception of this data by the FLCD 109, the image data following the start address is used to drive the FLCD 109 in accordance with the start address.

A write operation of data output from the binarization halftone processing circuit 305 may result in a plurality of discontinuous areas. The instruction of transfer to the FLCD 109 for the frame memory control circuit 307 is generated upon reception of the notification of the end of previous transfer to the FLCD. For this reason, the image data written in the frame memory 306 may not be immediately output to the FLCD 109. That is, as described above, since processing is performed through the frame memory 306, write access to the VRAM 301 is performed asynchronously with the output to the FLCD 109.

Figure 4:
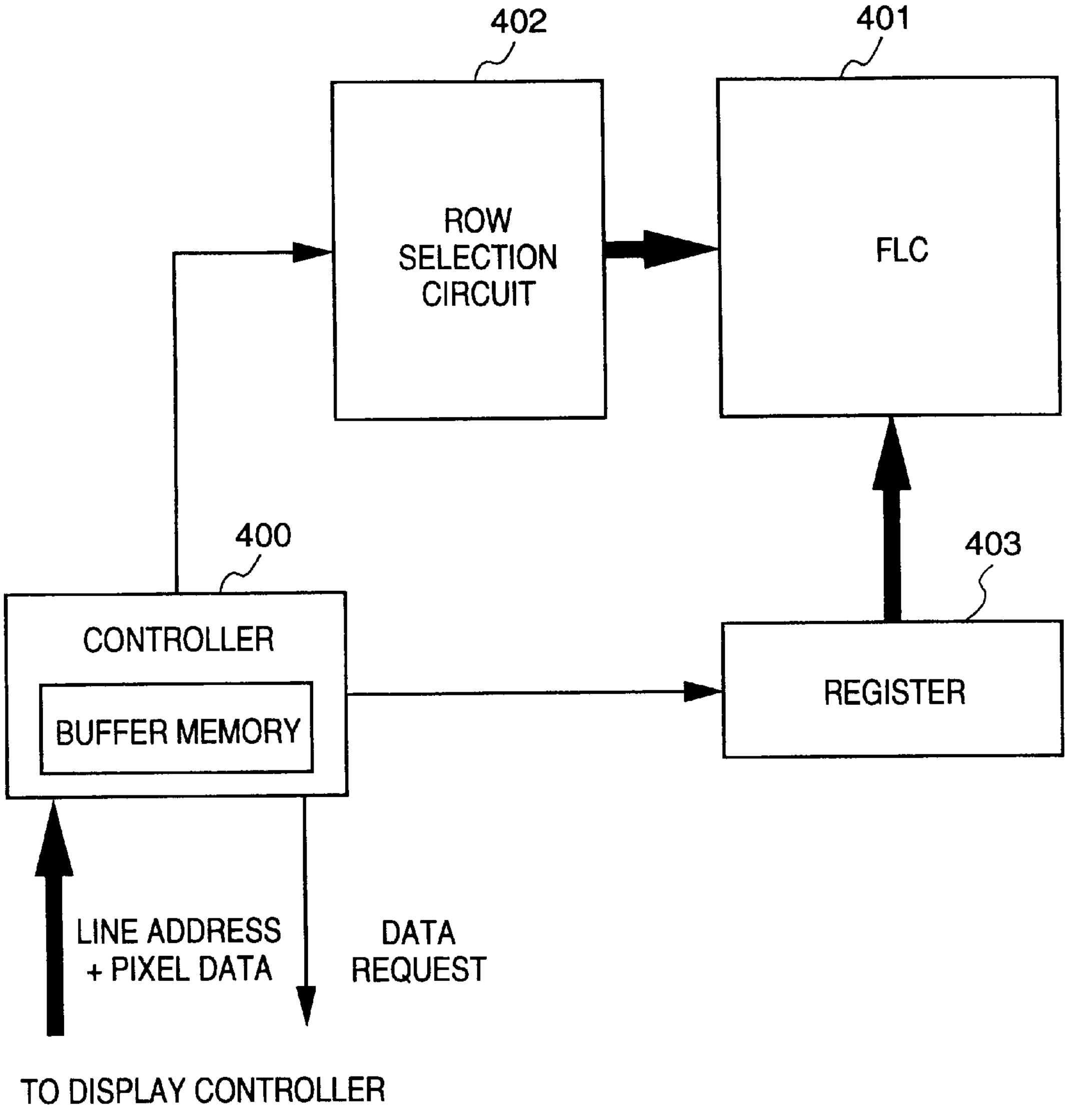
FIG. 4 is a block diagram of an FLCD in the embodiment shown in FIG. 1.

FIG. 4 is a block diagram of the FLCD 109 of this embodiment. Referring to FIG. 4, reference numeral 400 denotes a controller for controlling the entire FLCD; and 401, an FLC panel. Reference numeral 402 denotes a circuit for selecting one of the lines in the row direction of the FLC panel 401; and 403, a register having a one-line memory capacity.

The controller 400 receives the data having the format shown in FIG. 6 from the display controller 108, checks its start write address, and supplies data of the subsequently received pixel data RGBIRGBI . . . to the register 403. The controller 400 outputs an instruction to cause the row selection circuit 402 to select the line designated by the write address, thereby updating the display of the FLC panel 401. The controller 400 outputs a data transfer request signal to the display controller 108 every time interval (varying within the range of 60 to 70 $\mu$sec.) depending on the temperature obtained from a temperature sensor (not shown).

For example, when a 32-line transfer request is designated from the CPU 300, the frame memory control circuit 307 outputs data in units of lines in accordance with the above-mentioned format upon reception of every data transfer request. When transfer of all the designated lines is completed, and the next transfer request instruction is not received, if a data transfer request signal is received from the FLCD 109, the frame memory control circuit 307 notifies the CPU 300 of this fact in the form of an interrupt signal.

Upon reception of this notification, the CPU 300 determines whether nontransferred data of a partially rewritten image is present. If such nontransferred data is absent, the image data of all the frame stored in the frame memory 306 is designated and transferred to the FLCD 109 by the interlace scan. More specifically, every time this interrupt signal is received, the CPU 300 outputs an instruction to the frame memory control circuit 307 such that data is transferred in units of lines in the order of the 1st line, the third line, . . . , the 1023rd line, the second line, . . . , 1024th line. Note that when a transfer request signal is input from the FLCD 109, the CPU 300 designates a line to be transferred upon reception of the next transfer request signal.

As described above, when an image does not vary, the interlace scan is used to transfer data due to the following reason.

The FLCD 109 used in this embodiment has a function of storing and retaining the display image, as previously described. Therefore, only the image of an updated portion need be theoretically transferred. However, a small difference may occur in luminance at the boundary between an image which has not changed and need not be refreshed and an image which has changed and newly driven and displayed (partially rewritten image), thereby using the interlace scheme.

When a display image is partially updated, the FLCD 109 of this embodiment updates the display only at the updated portion. However, when no change is made in the display image, all the image in the frame memory 306 is transferred to the FLCD 109 by the interlace scan. Transfer is not performed in units of lines, but transfer is performed by the interlace scan due to the following reason. Since a liquid crystal display does not have a high response speed, the apparent updating speed of the display image is increased.

Check Method of Display Controller

Image data finally transferred to the FLCD 109 in the display controller 108 of this embodiment is stored not in the VRAM 301, but in the frame memory 306.

In this embodiment, it is already checked that the FLCD 109 normally operates. Checking if the display controller 108 normally operates is realized without connecting the FLCD 109 (or without monitoring the display screen of the connected FLCD 109).

Figure 5:
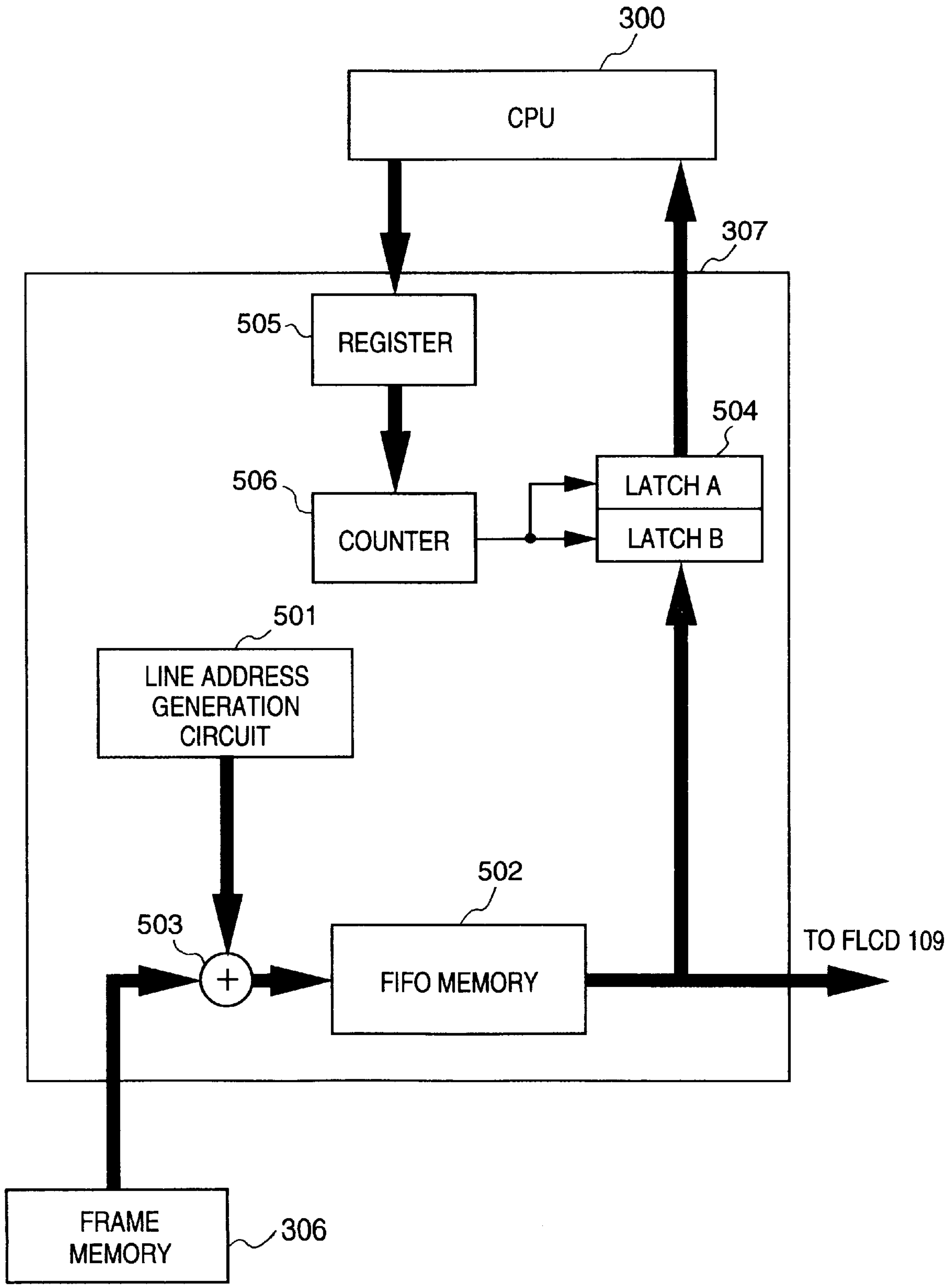
FIG. 5 is a block diagram showing part of a frame memory control circuit of the embodiment shown in FIG. 1.

The block diagram of the frame memory control circuit 307 of this embodiment to realize this function is shown in FIG. 5. FIG. 5 shows only the portion associated with this check, and the remaining portion is not illustrated. However, the check portion can be sufficiently understood from the contents of the above description.

Referring to FIG. 5, reference numeral 501 denotes a line address generation circuit for generating start address information (i.e., information representing the line number of desired data of the FLCD 109; start word information in FIG. 6) of data to be transferred to the FLCD 109. Note that the line address designated by the CPU 300 is set for the line address generation circuit 501, and that the line address generation circuit 501 updates the address to the next line for every 1-line transfer if a plurality of transfer lines are present.

Reference numeral 502 denotes a FIFO memory capable of storing image data (RGBI) of 1 address information+1-line image data. In this embodiment, one line has 1,280 pixels, and the transfer bus has a 16-bit (=1 word) width, so that 1280×4 (bits)=640 bytes. The FIFO memory 502 has a memory capacity of a total of 321 words (=320 words+1 additional word).

Reference numeral 504 denotes a latch circuit; and 505, a register for storing an address designated by the CPU 300. Reference numeral 506 denotes a counter. When image data of 1 address+1-line image data is transferred from the FIFO memory 502 to the FLCD 109 (i.e., the active period of a transfer enable signal (not shown)), the counter 506 counts transfer clocks (not shown) during this period. When the count value of the counter 506 coincides with the address held in the register 505, the counter 506 outputs a latch signal twice, i.e., two consecutive clocks to the latch 504.

With the above arrangement, assume that the CPU 300 stores an arbitrary address of transfer data in the register 505 and causes the frame memory control circuit 307 to perform transfer of a desired line. As a result, the latch 504 can hold the data of this arbitrary address (an arbitrary address location in one line) of the line and the next data. More specifically, two arbitrary words (8-pixel data) in the designated transfer data can be extracted.

When the CPU 300 reads out the data currently stored in the latch 504, the CPU 300 can check data to be transferred to the FLCD 109. Of course, “0” can be set in the register 505 to extract the contents of the write line address.

Figure 7:
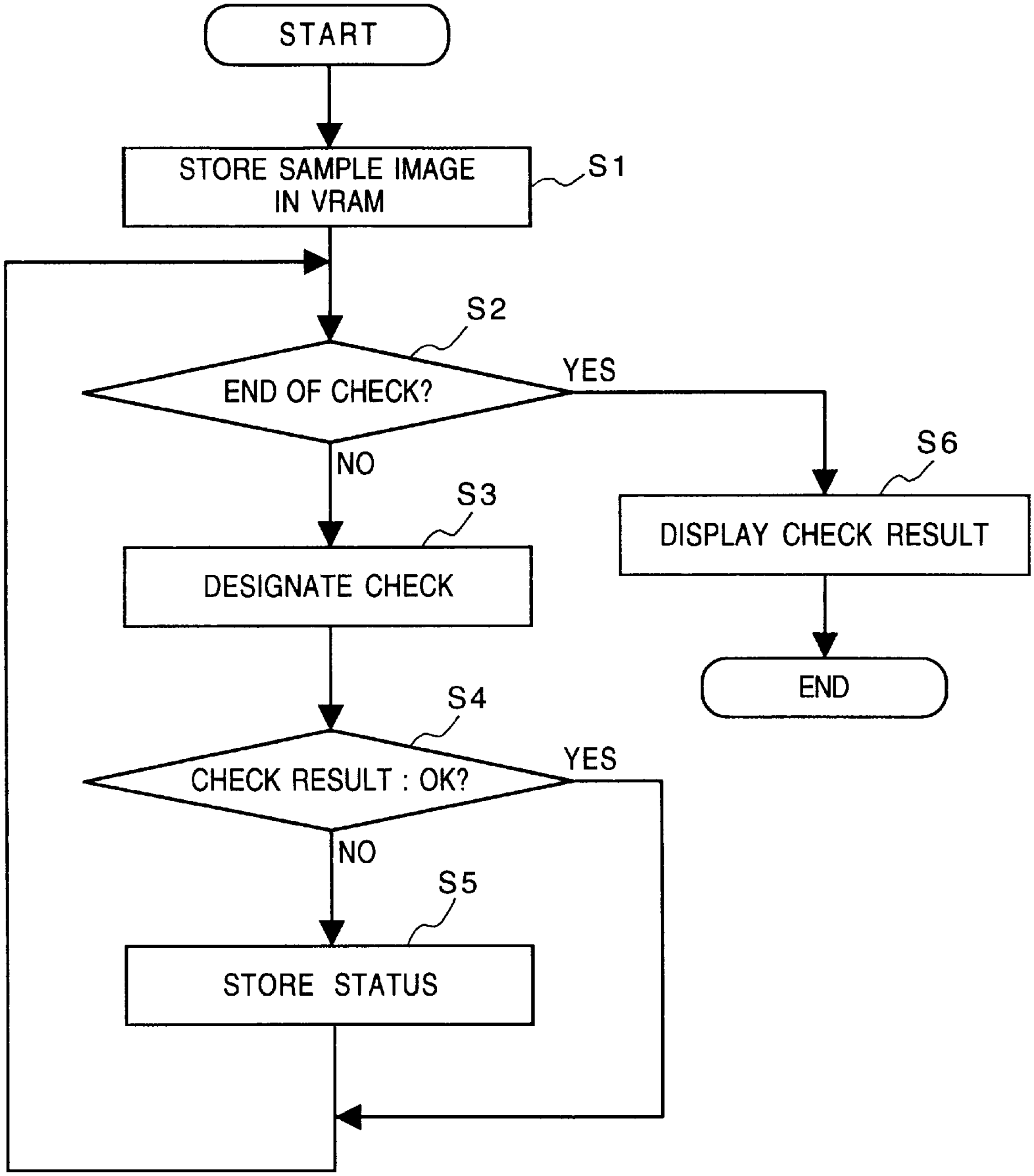
FIG. 7 is a flow chart showing the contents of check processing executed on the information processing system side in the embodiment shown in FIG. 1.
Figure 8:
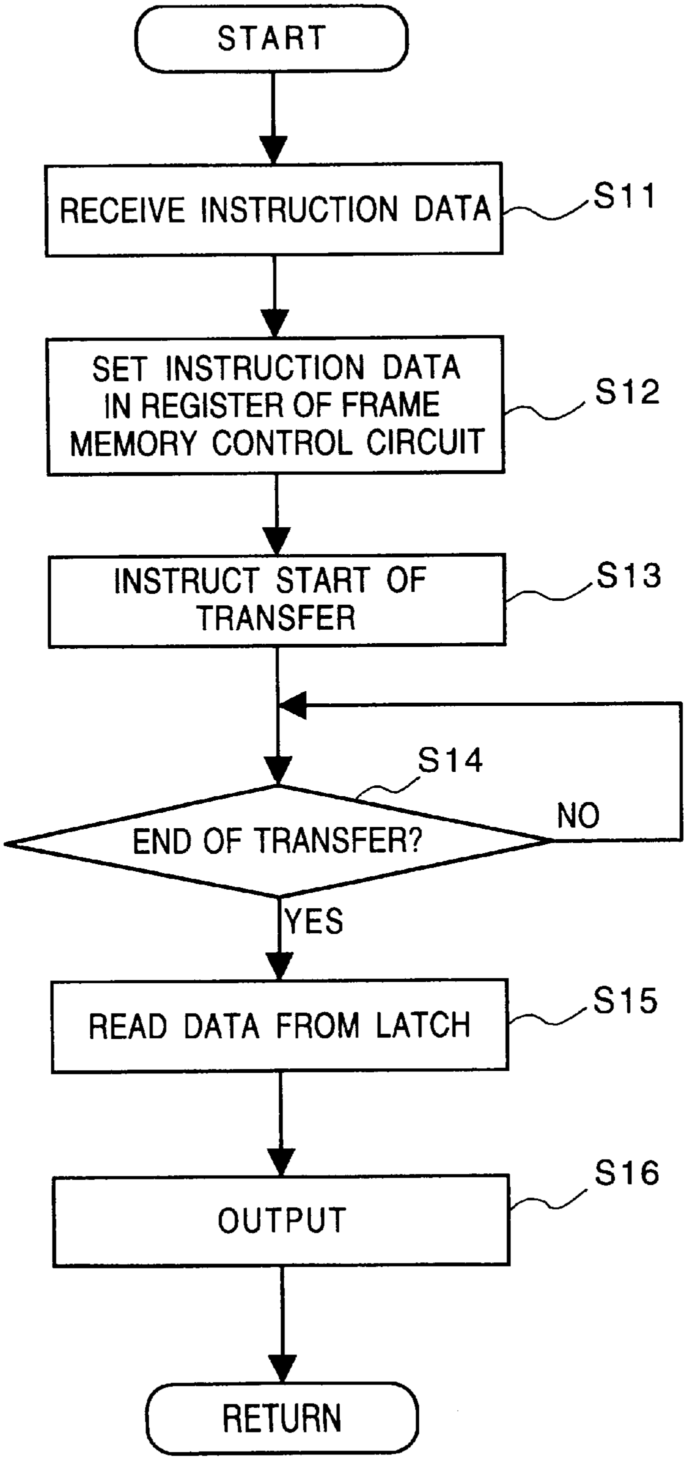
FIG. 8 is a flow chart showing the operation sequence of a CPU in the display controller in check processing in the embodiment shown in FIG. 1.

Check processing of the display controller of this embodiment having the above arrangement will be described with reference to flow charts in FIGS. 7 and 8. Note that a program of the flow chart in FIG. 7 is executed by the CPU 101 of the information processing system and stored in a HDD or the like. Also note that a program corresponding to the flow chart in FIG. 8 is stored in the ROM 308 in the display controller 108 and can be executed by the CPU 300.

First, the flow chart in FIG. 7 will be described below.

In step S1, the CPU 101 reads out sample image data or data for drawing this sample image from the HDD or the like and transfers it to the display controller 108 (accurately the VRAM 301) or causes the display controller 108 to draw the sample image. Note that a graphic cursor interlocked with a pointing device is not generally displayed, for the following reason. When the cursor is displayed during the check period and moves, write access to the VRAM 301 is performed by this movement, and the conversion result may exceed a predicted result.

The flow advances to step S2 to check if the check is completed. If YES in step S2, the flow advances to step S3 to instruct the CPU 300 in the display controller 108 to read a specific word address of a line having a specific line number.

The flow advances to step S4 to receive the converted data (2 words=8-pixel data in this embodiment) at the designated position from the display controller 108 (CPU 300) and compares the received data with the converted normal image data with respect to the sample image prestored in the HDD or the like.

As a result of comparison, if it is determined that the converted data at the designated position is correct, processing returns to step S2 so as to output the next instruction.

If, however, the converted data at the designated position does not coincide with the converted normal image data, the flow advances to step S5 to perform processing for storing the noncoincident data and its position in the main memory 104 (or the HDD or the like). The flow then returns to step S2.

If the check of the one-frame data is completed, the flow advances to step S6. If no abnormal data is present in the main memory 104, a message representing a normal check result is displayed. If abnormal data is present in the main memory 104, a message representing the specific position of the abnormal data is displayed. Note that notification need not be limited to the display of messages, but may be performed by an ON operation or flickering of a predetermined LED or tone generation by a buzzer or the like.

The processing sequence of the CPU 300 in the display controller 108 is now described with reference to the flow chart in FIG. 8. Note that this flow chart represents an interrupt routine upon reception of an instruction from the CPU 101.

First, in step S11, the CPU 300 fetches the designated data from the CPU 101. In step S12, the CPU 300 sets a word address extracted from a line address indicated by the designated data in the register 505 in the frame memory control circuit 307. The line address designated in the same manner as described is set, and the CPU 300 transfers the image data of this line to the FLCD 109 (step S13).

Upon completion of this transfer, the frame memory control circuit 307 outputs an interrupt signal to the CPU 300, and the CPU 300 detects this interrupt signal (step S14).

The flow advances to step S15 to cause the frame memory control circuit 307 to read out the data held in the latch. The readout data is output to the CPU on the information processing system side in step S16.

As described above, according to this embodiment, it can be diagnosed whether processing in the display controller 108 is normally performed. In addition, the test need not be performed while observing the screen on the FLCD 109, so that the check operation can be greatly facilitated.

The check processing has been described while mainly assuming the manufacturing process. The check processing may also be performed in an environment where the user actually uses the apparatus. In this case, the check processing may be performed in the initialization stage upon power-ON of the information processing apparatus. Alternatively, the check processing may be executed when the user designates it as needed.

Description of Second Embodiment

In the above embodiment, it is checked if processing in the display controller is normally performed. However, it is unknown whether transfer between the FIFO memory 307*a* and the FLCD 109 is normally performed in practice. The FIFO memory 307*a* is actually connected to the FLCD 109 through an interface cable, and a display controller interface, an FLCD interface, a line driver, and a line receiver are arranged for the display controller 108 and the FLCD 109. Therefore, solder and patterns on the boards of the display controller 108 and the FLCD 109, radiation noise reduction filters, and connectors fall outside the range of check processing.

These components are also checked in the second embodiment.

Figure 9:
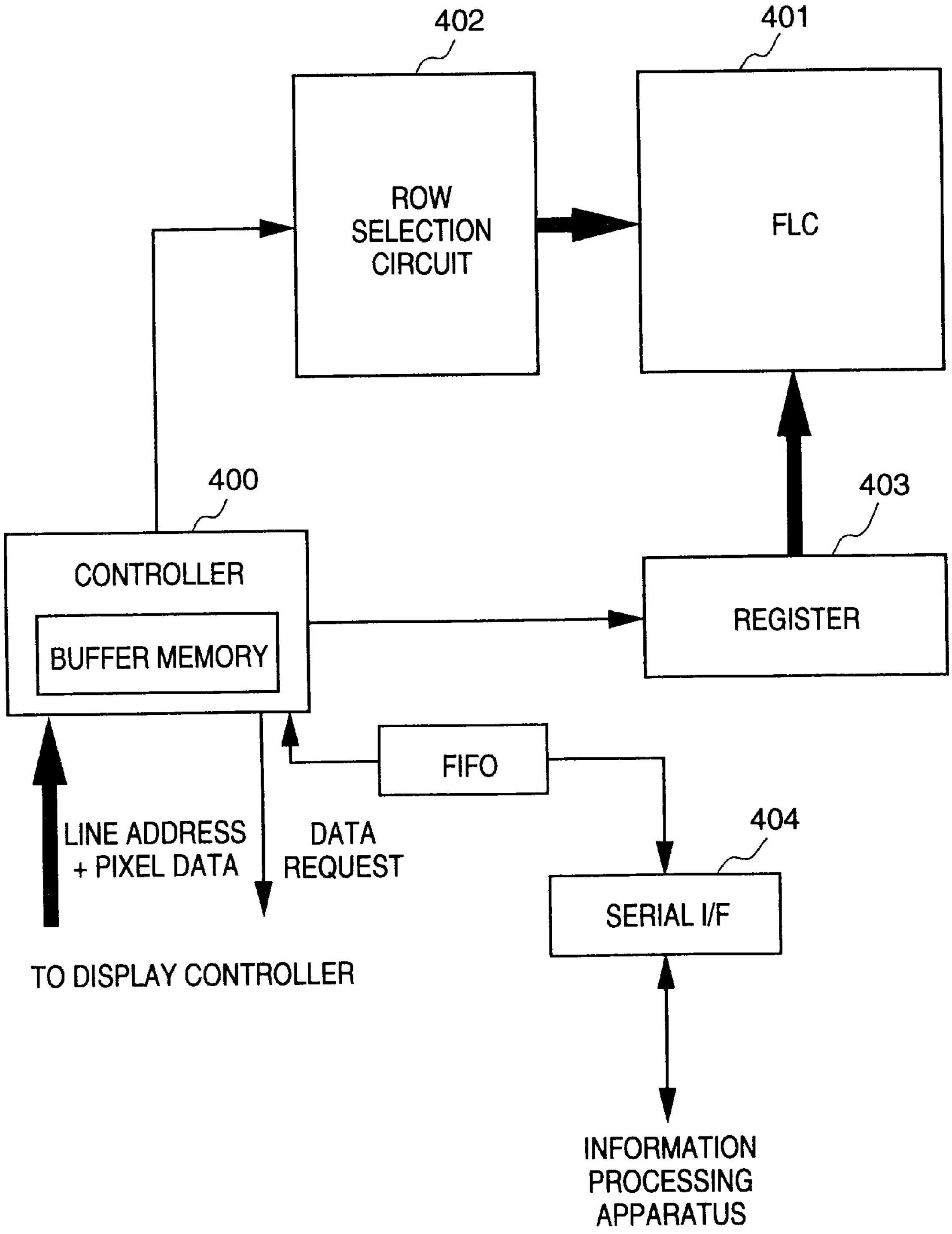
FIG. 9 is a block diagram of an FLCD according to the second embodiment.

FIG. 9 is a block diagram of an FLCD 109 of the second embodiment. The FLCD 109 of the second embodiment is different from that of FIG. 4 in that a FIFO serving as a buffer for synchronizing a serial interface 404 with the system is arranged. The remaining arrangement in FIG. 9 is same as that of FIG. 4.

The serial interface 404 is a versatile interface such as an RS232C interface. The reason why the versatile interface is used is that an interface such as an RS232C interface is generally a standard interface in an apparatus (e.g., a personal computer or a workstation) to which the FLCD is connected.

Figure 10:
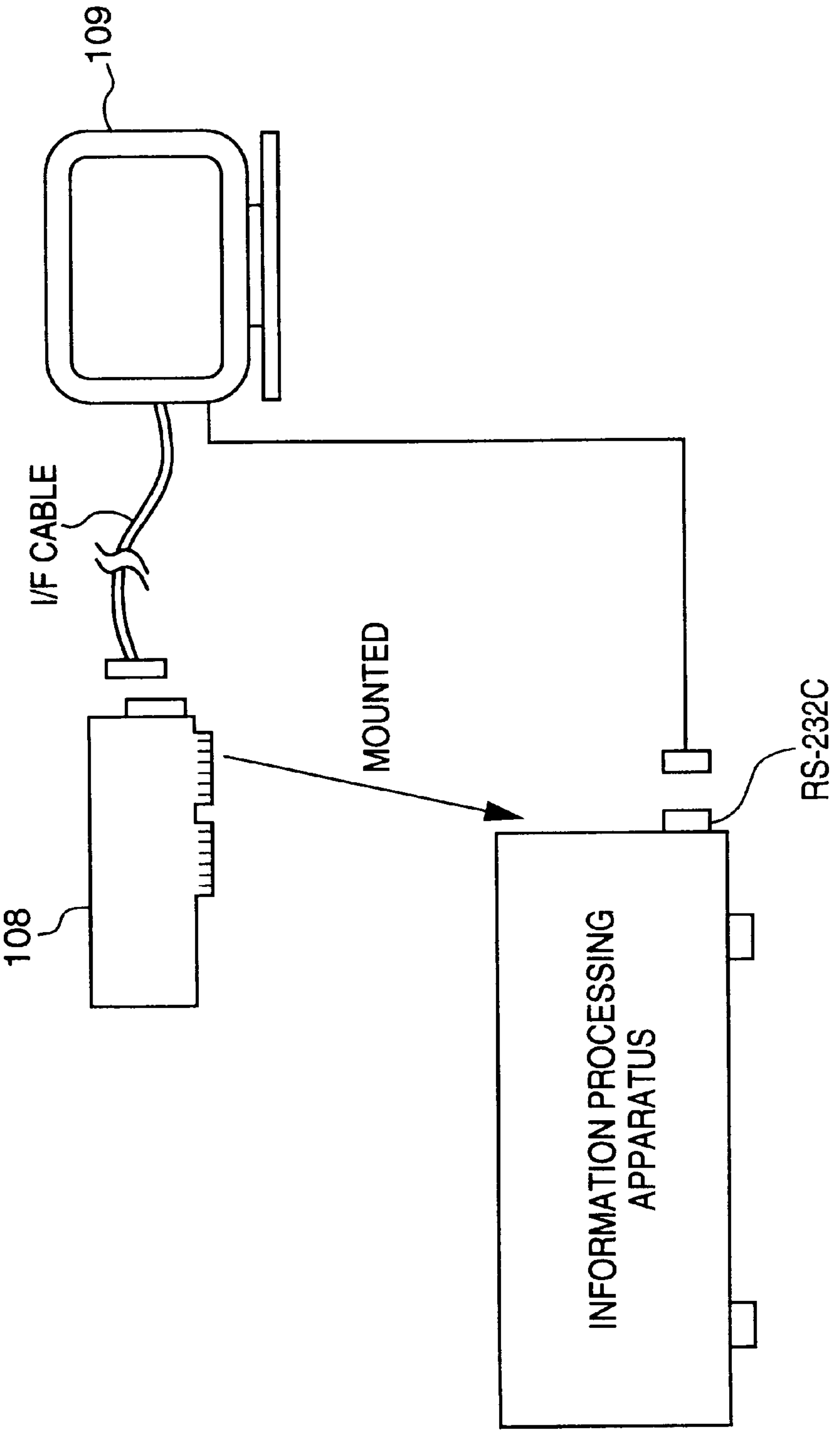
FIG. 10 is a view illustrating the relationship of connections between an information processing system, the FLCD, and a display controller in the second embodiment.

FIG. 10 shows the connection relationship between an information processing system (apparatus), the FLCD 109, and a display controller according to the second embodiment. As shown in FIG. 10, a serial cable from the FLCD 109 is connected to the serial interface (RS232C) on the information processing system side.

In the illustrated arrangement, a CPU 101 on the information processing system side outputs a command for testing the FLCD 109 through a serial port arranged in the apparatus itself and writes a sample image in a VRAM 301 in a display controller 108. The display controller 108 outputs line data to the FLCD 109 or designates a line address to be transferred to a CPU 300 in the display controller 108, as a normal operation.

A controller 400 on the FLCD 109 side outputs the data from the display controller 108 in the reception order to the information processing system through the serial interface 404. The CPU 101 on the information processing system side outputs a transfer instruction, receives the data (write line address+1-line data) received through the serial port, and checks matching. Note that the transfer order may be determined by the interlace scan. In this case, since the line data is sent with a line address, the display data can be reconstructed on the information processing system side in accordance with the line address.

Note that a check image may be or may not be displayed on the FLCD 109 during the check period.

In the first embodiment, the information volume to be checked is given in units of 2 words, i.e., 8 pixels. In the second embodiment, the transferred data is sent back at once due to the following reason. Serial communication has a transfer rate lower than that of the first embodiment. If transfer is performed in units of bytes, the overhead amount excessively increases. If check processing is performed through an interface which does not limit the transfer rate, the above limitation is not imposed. For example, when the display controller 108 and the FLCD 109 are connected through a bidirectional communication interface, an additional interface need not be arranged for the FLCD.

Note that if a transfer instruction is output from the CPU 300 upon a partial rewrite operation, a frame memory control circuit 307 in the above embodiment does not output an interrupt signal responsive to a data transfer request signal from the FLCD 109 to the CPU 300 during the transfer of the partially rewritten image. However, the frame memory control circuit 307 may output an interrupt signal regardless of its operating state.

In this case, when the CPU 300 outputs a partial rewrite instruction, the CPU 300 has detected the number of lines to be transferred. Every time an interrupt is received, the CPU 300 decrements the number of lines and checks the count value. Therefore, the CPU 300 can detect whether an interrupt is caused by the end of transfer or an interrupt is generated during transfer by interlace scan.

The processing sequences of the CPUs 101 and 300 in the above embodiments are merely examples, and the present invention is not limited to these sequences. It is essential to interpose a frame memory 306 in transfer of a partially rewritten image to the FLCD in an asynchronous manner.

Note that the display controller 108 or the FLCD 109 may be arranged integrally with an information processing apparatus as a standard equipment, or may be mounted in a standard expansion slot of an apparatus represented by a personal computer.

The CPU 300 in the display controller 108 performs processing in accordance with the program stored in a ROM 308. However, a RAM or a programmable, memory retainable EEPROM may be used in place of the ROM 308.

When a RAM is used in place of the ROM 308, the corresponding program is downloaded to the CPU 300 in the display controller 108 in the initial stage of driver software for driving the FLCD interface upon power-ON on the information processing apparatus side. Note that the use of the RAM or EEPROM can facilitate a change in processing program of the CPU 300 and debugging of the program.

The information processing apparatus or an FLCD interface apparatus may be a single apparatus or a combination of a plurality of apparatuses, or may be applied when an external program is supplied.

The present invention is not limited to the particular embodiments described above. Various changes and modifications may be made without departing from the spirit and scope of the invention.

Each embodiment described above has exemplified an FLCD, i.e., a ferroelectric liquid crystal display. The number of display colors is 16. The present invention is not limited to these, either. The present invention is applicable to any apparatus in which image data stored in a VRAM is subjected to some processing, and the processed data is displayed.

According to the first and second embodiments described above, converted image data corresponding to a display can be obtained and need not be visually checked.

Description of Third Embodiment

The operation of the display controller 108 has been generally described in the first embodiment. The detailed processing contents will be described in the third embodiment.

Figure 11:
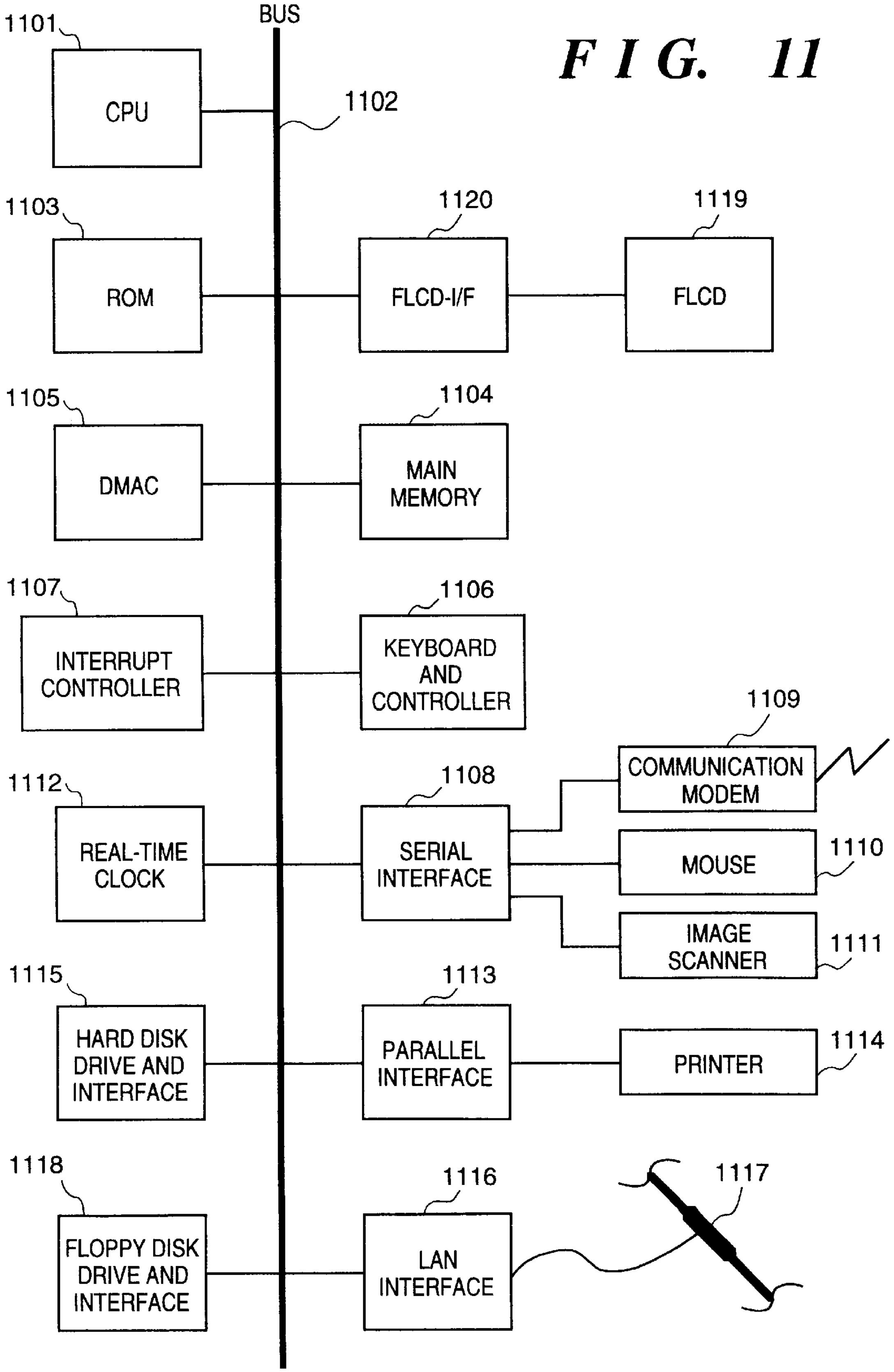
FIG. 11 is a block diagram showing an information processing system according to the third embodiment.

An information processing apparatus of the third embodiment has an arrangement shown in FIG. 11. The information processing apparatus of the third embodiment is different from that of FIG. 1 in that the apparatus of the third embodiment has only one high-speed bus, although the apparatus of FIG. 1 has high- and middle-speed buses.

Referring to FIG. 11, reference numeral 1101 denotes a CPU for controlling the overall information processing system; 1102, a system bus having an address bus, a control bus, and a data bus; and 1103, a ROM storing a boot program, a BIOS, and the like. Reference numeral 1104 denotes a main memory including a RAM in which the OS and various application programs are loaded. Reference numeral 1105 denotes a direct memory access controller (DMAC) for performing high-speed data transfer between memories and between the memories and devices. Reference numeral 1106 denotes a keyboard controller for controlling a keyboard and a signal from the keyboard and supplying the signal to the CPU 1101 through the system bus 1102. Reference numeral 1107 denotes an interrupt controller for controlling generation of various interrupts to the CPU 1101. Reference numeral 1108 denotes a serial interface (e.g., an RS232C interface) for connecting (or capable of connecting) a communication modem 1109, a mouse 1110 serving as one of the pointing devices, and an image scanner 1111. Reference numeral 1112 denotes a real-time clock including a quartz oscillator to count time based on the clocks from the quartz oscillator; and 1113, a parallel interface. A printer 1114 is connected to, e.g., this parallel interface 1113. Reference numeral 1115 denotes a large-capacity memory device such as a hard disk or a magnetooptical disk and its interface (e.g., a SCSI interface). Reference numeral 1116 denotes a LAN interface connected to, e.g., an Ethernet (a LAN having a bus structure by a joint venture of Xerox, DEC, and Intel, U.S.A.) 1117. Reference numeral 1118 denotes a floppy disk device and its interface. Reference numeral 1119 denotes an FLC display (FLCD) constituting the display screen of the above apparatus; and 1120, an interface (FLCD I/F) for connecting the FLCD 1119 and this system.

For the sake of descriptive simplicity, the FLCD I/F 1120 has the same arrangement as that of the display controller 108 of the first embodiment. The FLCD 1119 has the same arrangement as that of the FLCD 109 of the first embodiment. Reference numerals shown in FIGS. 3 and 4 are used for the constituent components of the FLCD I/F 1120 and the FLCD 1119.

The processing contents of the FLCD I/F 1120 and the FLCD 1119 are identical to those of the first embodiment, as a matter of course.

The operation will be described in detail.

The processing sequence of a CPU 300 in the FLCD I/F 1120 will be described with reference to FIG. 12.

Note that the meanings of the respective illustrated flags are as follows.

A) Quantization End Flag

This flag holds information representing whether a frame memory control circuit 307 has completely stored image data from a binarization halftone processing circuit 305 in a frame memory 306.

B) Transfer End Flag

This flag holds information representing whether the frame memory control circuit 307 has completely transferred an image of a position designated by the CPU 300 to the FLCD 1119.

C) Transfer Request Flag

This flag holds information representing whether the FLCD 1119 has sent the next data transfer request. This transfer request flag is not set unless the frame memory control circuit 307 completes transfer of the number of lines designated by the CPU 300 (because a transfer request signal during this period is used as the transfer timing of the frame memory control circuit 307, and an interrupt signal responsive to this transfer request signal is not generated).

Assume that an area flag portion (32 bits) read from a rewrite detection/flag generation circuit 303 is given in an illustrated state (timing T1).

In this case, the CPU 300 checks the area flag portion from the beginning and can detect the first area position (to be referred to as an area No. hereinafter) "2" set at "1". An address and the number of lines to be set in the frame memory control circuit 307, the binarization halftone processing circuit 305, and a line address generation circuit 304 are calculated and are set in the order named. The frame memory control circuit 307 has the first position order because the circuit 307 operates when enable signals (FIG. 3) of the respective circuits are set enable. If the order is reversed, higher circuits output data even if lower circuits are not prepared yet.

When the address and the number of lines are set in the last line address generation circuit 304, this setting operation triggers an SVGA chip 302. The SVGA 302 sets the enable signal of the lower binarization halftone processing circuit 305 to start data transfer.

The binarization halftone processing circuit generates image data having 1-bit R, G, B, and I signals by error diffusion processing on the basis of 8-bit R, G, and B data. When the current line reaches the line (5th line) set by the CPU 300, the binarization halftone processing circuit sets the enable signal to the lower frame memory control circuit 307 and outputs the processing result.

The frame memory control circuit 307 sequentially stores the processed image data input from the binarization halftone processing circuit 305 in a frame memory 306 at the address locations designated by the CPU 300. When this storage processing is completed, the frame memory control circuit 307 outputs an interrupt signal representing the end of storage to the CPU 300.

Upon reception of this interrupt signal, the CPU 300 sets a quantization end flag (timing T2) and sends, to the frame memory control circuit 307, an instruction (settings of the address and the number of lines) of transfer to the FLCD 1119. The CPU 300 also searches for set area Nos. other than area No. "2" in the area flag portion. If any set area No. is found, the same processing described above is performed. In the illustrated case, write access is confirmed for area No. "4". Processing up to storage in the frame memory 306 is performed. When this storage processing is completed (timing T3), the same processing is performed for the subsequent set area Nos. in the area flag portion.

During this processing, upon reception of an interrupt signal representing the end of previously designated transfer of area No. "2" from the frame memory control circuit 307, the CPU 300 sets "1" in the transfer end flag for area No. "2" (timing T4). The CPU 300 then determines whether other set area Nos. whose quantization end flags are "1" are present. If any set area No. whose quantization end flag is "1" is present, the CPU 300 designates transfer to the FLCD 1119.

Note that the generation order of timings T4 and T3 is indefinite and depends on the data volume to be processed.

Upon reception of the transfer end notification, when data to be transferred next is absent, the frame memory control circuit 307 outputs an interrupt signal based on the data transfer request signal from the FLCD 1119 (timing T5). Upon reception of this interrupt signal, the CPU 300 reads the area flag portion of the rewrite detection/flag generation circuit 303.

If no bit of "1" is present in the read area flag portion, the address of one line to be transferred is so set as to perform interlaced transfer (transfer of every other line) of the frame memory 306, as previously described. When this transfer is completed, the frame memory control circuit 307 receives a data transfer request signal from the FLCD 1119. At this time, since data transfer of one line has been completed, the frame memory control circuit 307 outputs an interrupt signal to the CPU 300.

Every time an interrupt signal is output, the CPU 300 reads the area flag portion from the rewrite detection/flag generation circuit 303. While all the bits are "0"s, the previous interlaced transfer continues.

Figure 12:
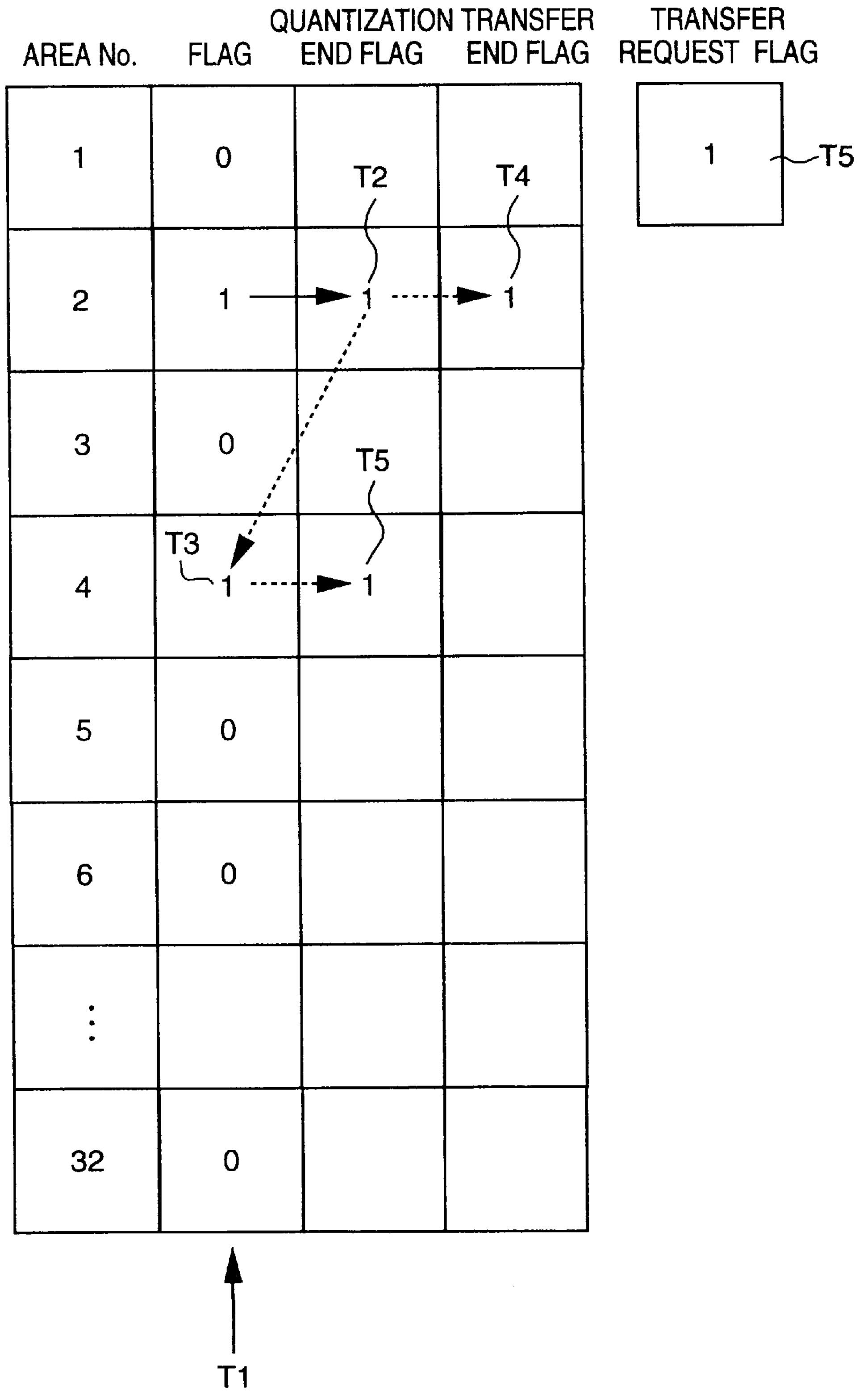
FIG. 12 is a view showing flag shifts during the operation of a CPU in an FLCD interface in the third embodiment.

More specifically, when the area flag portion in FIG. 12 is read out, and if it is detected that any area No. set at "1" is present, processing is performed as if the area flag shifted in the illustrated flag table in the right direction.

A series of processing operations performed by the CPU 300 to realize the above processing of this embodiment will be described with reference to the flow charts in FIGS. 13 to 16. Note that a program based on these flow charts is stored in a ROM 308.

Figure 13:
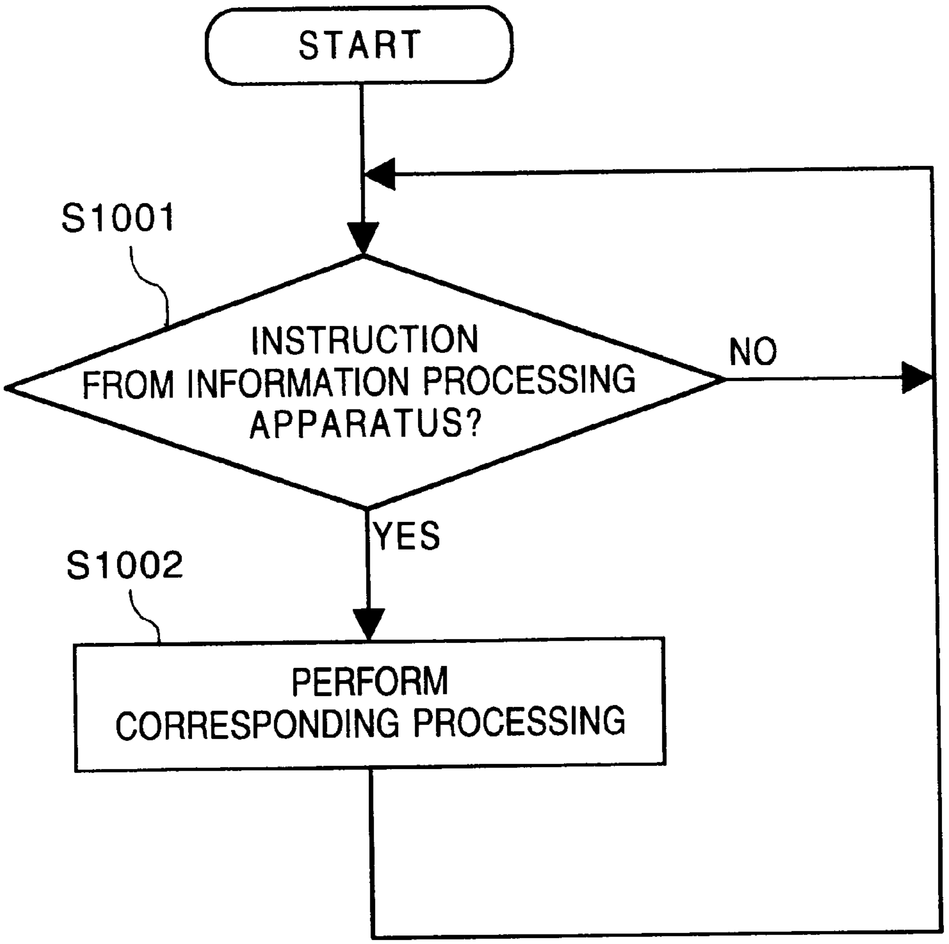
FIG. 13 is a flow chart showing the main processing routine of a CPU 300 in the FLCD interface in the third embodiment.

FIG. 13 is a flow chart showing the main processing routine of the CPU 300 in the FLCD interface 1120 of this embodiment.

In step S1001, the CPU 300 determines whether an instruction representing the number of display dots is output through the bus 1102 of the information processing apparatus. If YES in step S1001, the flow advances to step S1002. The instruction is set in the rewrite detection/flag generation circuit 303 and the circuits 305 to 307 as environmental information so as to set the designated number of display dots.

Note that the FLCD 1119 of this embodiment has a display capacity of 1,280×1,024 dots, as previously described. For example, when an instruction represents 1,024×768, the image is preferably displayed at the center of the display screen because the operator feels it more natural that way. Processing in step S1002 is performed to realize this. For example, to specify the rewritten line position, the rewrite detection/flag generation circuit 303 divides the rewritten address by the number of bytes of one line. In this case, the number of bytes of one line is determined by the number of display dots.

An operation to be performed upon reception of a display instruction for 1,280×1,024 dots will be described below.

Figure 14:
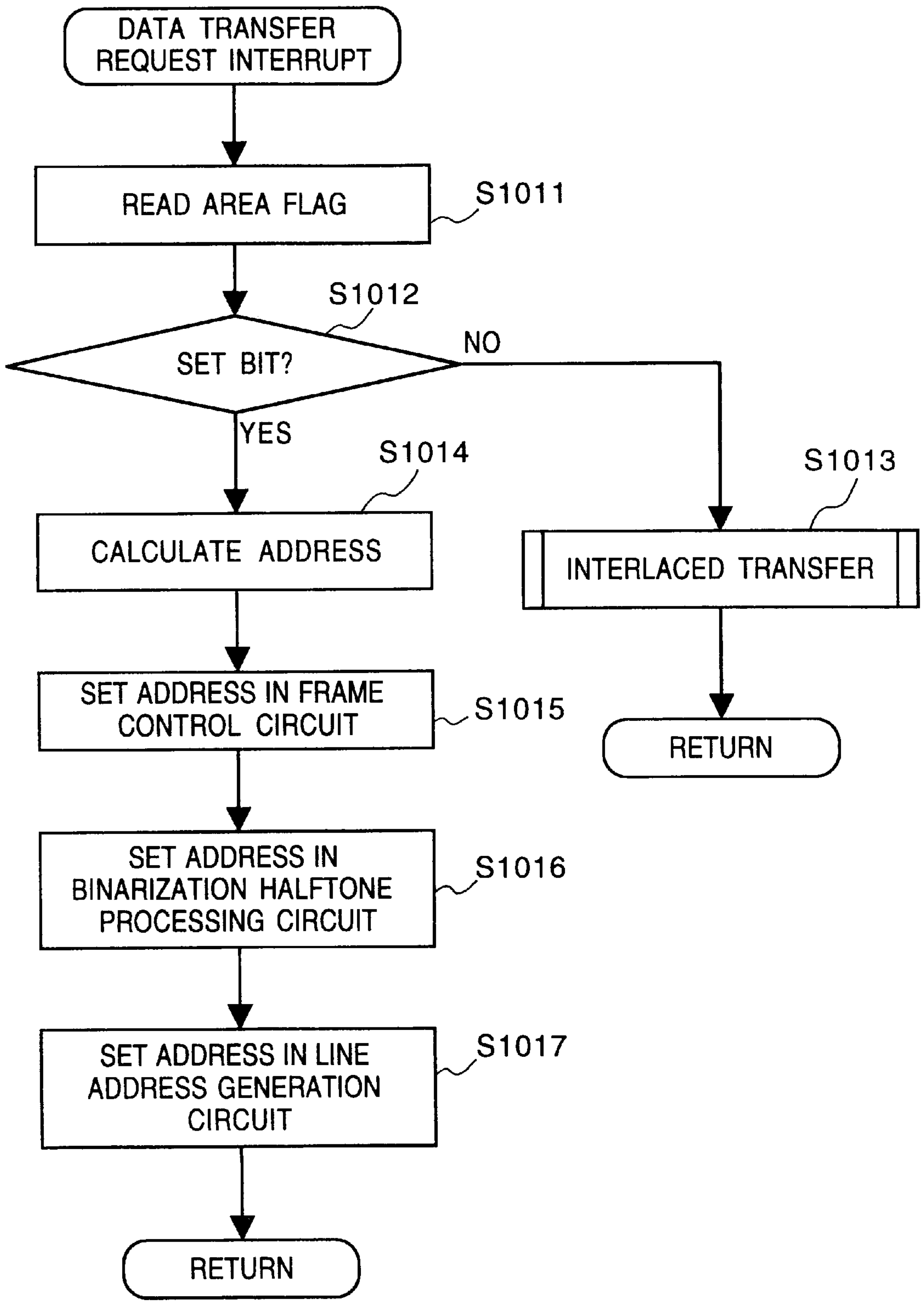
FIG. 14 is a flow chart showing the interrupt routine activated upon reception of a data transfer request signal from a frame memory control circuit in the third embodiment.

FIG. 14 is a flow chart showing an interrupt routine activated upon reception of a data transfer request signal from the frame memory control circuit 307.

Upon reception of the transfer instruction for the image of the number of lines designated for the FLCD 1119 by the CPU 300, the frame memory control circuit 307 transfers data in synchronism with the data transfer request signal from the FLCD 1119, as previously described. Assume that at present no instruction is output from the CPU 300 or the designated transfer is completed. In this case, upon reception of the data transfer request signal from the FLCD 1119, the frame memory control circuit 307 directly outputs it as an interrupt signal to the CPU 300. In other words, when a data transfer request is received from the FLCD 1119 while transfer is being performed upon reception of a series of transfer requests, the frame memory control circuit 307 does not output this signal to the CPU 300.

FIG. 14 shows a flow chart of processing upon reception of this interrupt signal. That is, this processing is interrupt processing performed upon completion of transfer of data to be sent.

In step S1011, 32 bits of the area flag portion are read from the rewrite detection/flag generation circuit 303. At the same time, the rewrite detection/flag generation circuit 303 is reset, i.e., the internal area flags are cleared to zeros.

In step S1012, it is determined whether a set bit is present in the read area flag portion, i.e., whether a rewritten portion is present. When it is determined that all the bits are "0"s, the flow advances to step S1013 to perform interlaced transfer. That is, when no write access to the VRAM 301 is performed, interlaced transfer (i.e., an instruction for transfer of one-line data from the frame memory 306 in an interlaced manner) every time a data transfer request is received from the FLCD 1119.

If it is determined that a set bit is present in the read area, the flow advances to step S1014. An address and the number of lines to be set in each circuit are calculated. Note that when bits for consecutive areas, e.g., area Nos. 10 to 12 (areas of 289th to 384th lines) are set, an address and the number of lines are calculated under the assumption that these consecutive areas are one area.

Upon completion of the above calculations, pieces of information are set in the frame memory control circuit 307 and the binarization halftone processing circuit 305, and finally the line address generation circuit 304 in steps S1015 to S1017, respectively. Binarization halftone processing (quantization processing) is started. As previously described, an address which is 5 lines ahead of the start line of the rewritten area is set in the line address generation circuit 304. Note that when area No. "1" is rewritten, five preceding lines are absent. In this case, the address obtained from area No. is directly used.

As a result, first quantization processing upon reading the area flag portion and defecting the presence of a set bit in the read area flag portion is started.

Figure 15:
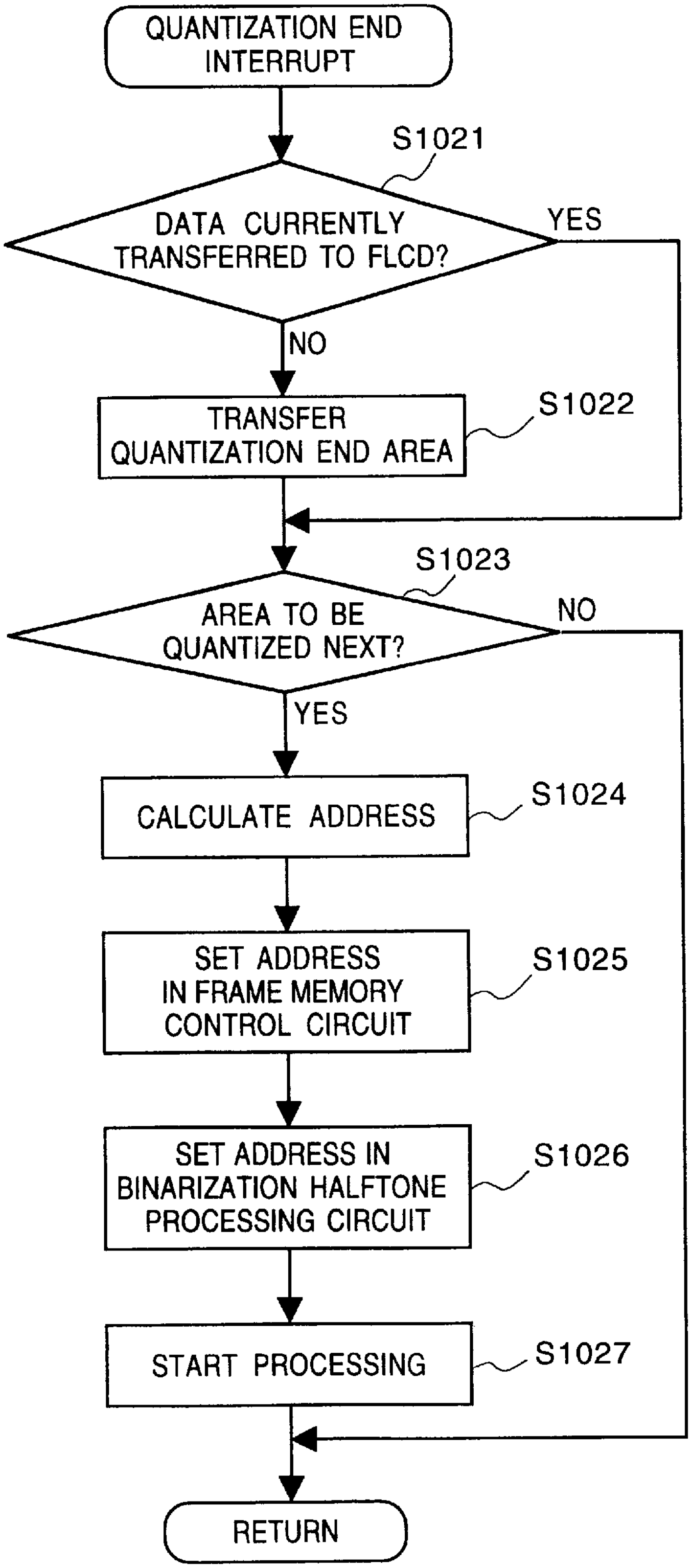
FIG. 15 is a flow chart showing processing activated upon reception of a quantization end message from the frame memory control circuit in the third embodiment.

FIG. 15 is a flow chart of an operation for causing the frame memory control circuit 307 to output an interrupt signal when the circuit 307 receives the quantized image data from the binarization halftone processing circuit 305 and storage of the quantized image data in the frame memory 306 is completed.

In step S1021, it is determined whether the frame memory control circuit 307 is currently transferring a partially rewritten image to the FLCD 1119.

If NO in step S1021, i.e., if interlaced transfer is currently performed, and it is determined that storage of the first partially rewritten image in the frame memory 306 is completed, the flow advances to step S1022. The address and the number of lines are set in the frame memory control circuit 307 so as to transfer the quantized image data which has been completely stored, thereby transferring the partially rewritten image.

The flow advances to step S1023 to determine by checking the already read area flag portion whether an area to be quantized next is present.

If it is determined some non-quantized area is present, an address and the number of lines are calculated for this area in step S1024. In steps S1025 to S1027, pieces of information are respectively set in the circuits, and next quantization processing is started. Note that steps S1024 to S1027 are identical to steps 1014 to S1017 previously described, and a detailed description thereof will be omitted.

Figure 16:
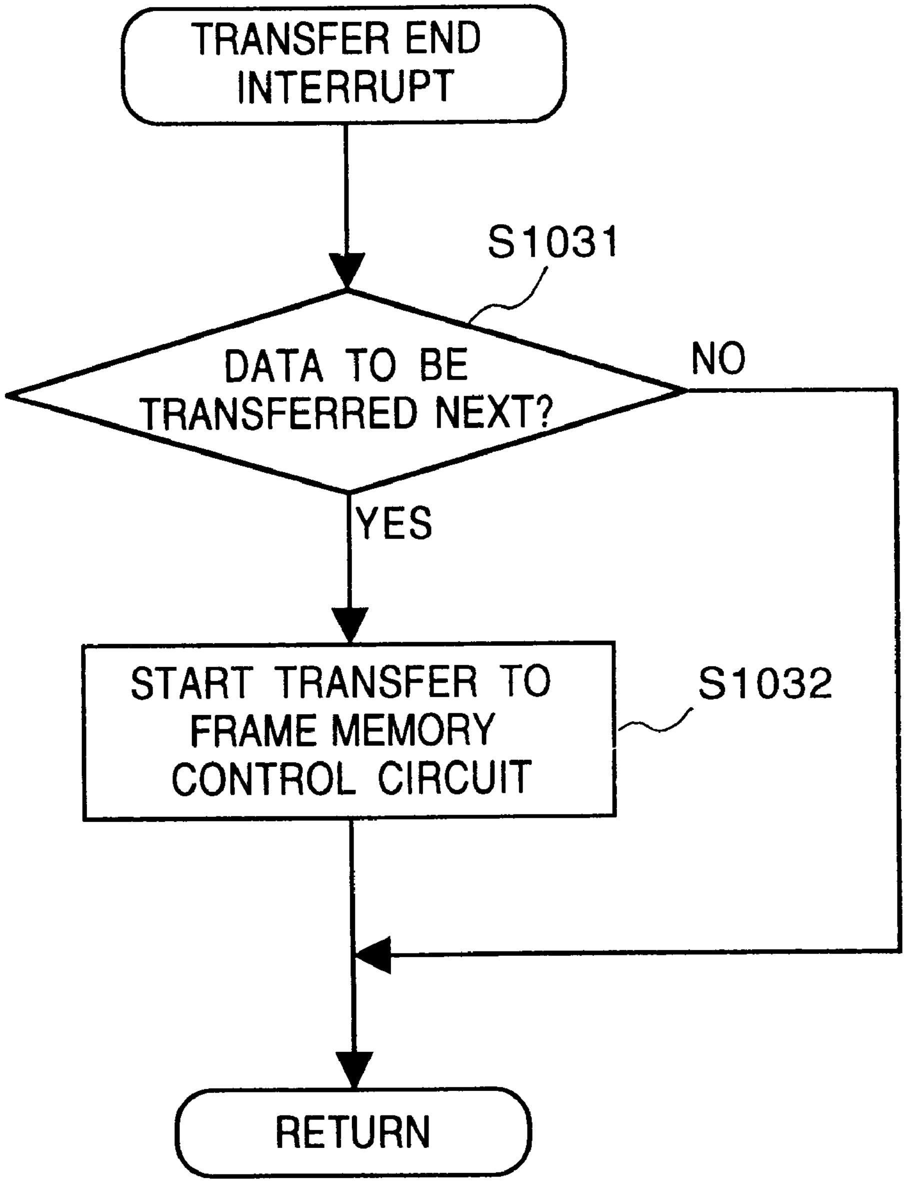
FIG. 16 is a flow chart showing processing activated upon reception of a transfer end message from the frame memory control circuit to the FLCD in the third embodiment.

FIG. 16 is a flow chart of processing of an interrupt to be notified when transfer of the partially rewritten image to the FLCD 1119, which is designated by the CPU 300, is completed.

In step S1031, it is determined whether data to be transferred next is present. The number of cases which are determined as NO in step S1031 are two. One case is an end of transfer of the images of all the partial rewrite areas to the FLCD 1119. The other case is a case in which the quantization processing described above is not completed. In any case, when it is determined that data to be transferred is absent, this processing is ended.

When it is determined that data to be transferred is present, the flow advances to step S1032. A transfer start line address and the number of lines are set in the frame memory control circuit 307 so as to transfer data of this area to the FLCD 1119, thereby starting transfer processing.

As described above, the CPU 300 performs the above processing, so that the display of the partially rewritten portion can be updated, and the interlaced display can be performed in the absence of a change. The main component of these processing operations is the CPU 300. However, as described above, the processing operations greatly depend on the frame memory control circuit 307, i.e., are greatly influenced by the presence of the frame memory 306.

As described above, according to this embodiment, write access to the VRAM 301 and the display and updating of the FLCD 1119 can be asynchronously performed. Therefore, the features of the FLCD 1119 can be maximized to perform an effective display.

In the above embodiment, when a transfer instruction for a partial rewrite operation is output from the CPU 300, the frame memory control circuit 307 does not output, to the CPU 300, an interrupt signal for the data transfer request signal from the FLCD 1119 during transfer of the partially rewritten image. However, the frame memory control circuit 307 may output an interrupt signal in any operating state.

In this case, when the CPU 300 outputs a partial rewrite instruction, the CPU 300 has detected the number of lines to be transferred. Every time an interrupt signal is received, the CPU 300 decrements the count and checks the count value. Therefore, the CPU 300 can determine whether the interrupt signal is generated upon completion of transfer or the interrupt signal is generated during interlaced transfer.

The processing sequence of the CPU 300 in the above embodiment is merely an example. The present invention is not limited to this processing sequence. It is essential to perform asynchronous transfer through the frame memory 306 in the transfer of the partial rewritten image to the FLCD.

The FLCD interface or the FLCD 1119 in this embodiment may be arranged integrally with the information processing apparatus from the beginning or may be mounted in a standard expansion slot arranged in an apparatus represented by a personal computer.

The CPU 300 in the display controller 108 performs processing in accordance with the program stored in a ROM 308. However, a RAM or a programmable, memory retainable EEPROM may be used in place of the ROM 308.

When a RAM is used in place of the ROM 308, the corresponding program is downloaded to the CPU 300 in the display controller 108 in the initial stage of driver software for driving the FLCD interface upon power-ON on the information processing apparatus side. Note that the use of the RAM or EEPROM can facilitate a change in processing program of the CPU 300 and debugging of the program. Therefore, according to the present invention, the programs for realizing the above processing may be stored in a storage medium such as an FD or CD-ROM.

The information processing apparatus or an FLCD interface apparatus may be a single apparatus or a combination of a plurality of apparatuses, or may be applied when an external program is supplied.

The present invention is not limited to the particular embodiments described above. Various changes and modifications may be made without departing from the spirit and scope of the invention.

Each embodiment described above has exemplified an FLCD, i.e., a ferroelectric liquid crystal display. The number of display colors is 16. The present invention is not limited to these, either. The present invention is applicable to any apparatus in which image data stored in a VRAM is subjected to some processing, and the processed data is displayed.

As described above, according to the third embodiment, a good image can be displayed on a display having display image storage retention characteristics at a high response speed.

What is claimed is:

1. A display control apparatus for performing display control of a display in accordance with image data supplied from a host computer, comprising:

first memory means for storing the image data of a display image;

second memory means for storing data in a display format of said display;

conversion means for converting the image data stored in said first memory means into a data format corresponding to said display and outputting the converted data to said second memory means;

output means for transferring the data stored in said second memory means to said display and for outputting at least part of the data stored in said second memory means to the host computer in accordance with a predetermined instruction from the host computer.

2. The apparatus according to claim 1, wherein said display has storage retention characteristics of display contents.

3. The apparatus according to claim 2, wherein said display is a ferroelectric liquid crystal display.

4. The apparatus according to claim 1, wherein the instruction from the host computer includes a line address of the image transferred to said display and a position address based on a unit of transfer.

5. The apparatus according to claim 1, wherein said host computer is a general-purpose information processing apparatus, and said display control apparatus is connected to an expansion bus arranged in said general-purpose information processing apparatus.

6. An information processing apparatus for processing information and displaying an image on a display through a predetermined display control circuit, wherein said display control circuit comprises:

first memory means for storing original image data of a display image from a host circuit of said information processing apparatus;

second memory means for storing data in a display format of said display;

conversion means for converting the image data stored in said first memory means into a data format corresponding to said display and outputting the converted data to said second memory means; and output means for transferring the data stored in said second memory means to said display and for outputting at least part of the data stored in said second memory means to said host circuit in accordance with a predetermined instruction from said host circuit.

7. The apparatus according to claim 6, wherein said display has storage retention characteristics of display contents.

8. The apparatus according to claim 7, wherein said display is a ferroelectric liquid crystal display.

9. The apparatus according to claim 6, wherein the instruction from said host circuit includes a line address of the image transferred to said display and a position address based on a unit of transfer.

10. The apparatus according to claim 6, wherein said display control circuit is a separate circuit connected to an expansion bus arranged in said information processing apparatus.

11. A display control apparatus adapted to be connected to a display having display image storage retention properties, comprising:

first memory means for storing original image data of a display image;

second memory means for storing data in a display format of said display;

monitor means for monitoring access to said first memory means;

conversion means for converting image data in a written area into a display data format of said display when write access to said first memory means is detected by said monitor means;

storage means for storing the converted image data in said second memory means;

determination means for determining whether a non-output image to said display is left in said second memory means; and output means for outputting the non-output image to said display when said determination means determines that non-output image is left in said second memory means.

12. The apparatus according to claim 11, wherein said second memory means has a capacity corresponding to a total size of a frame displayed on said display, and said display control apparatus further comprises second output means for outputting all images stored in said second memory means to said display when said determination means determines that no non-output image is left in said second memory means.

13. The apparatus according to claim 12, wherein said second output means performs interlaced scanning of an image stored in said second memory means and outputs the interlaced image to said display.

14. The apparatus according to claim 11, wherein said display control apparatus is connected to an expansion bus arranged in a general-purpose information processing apparatus.

15. The apparatus according to claim 11, wherein said display is a ferroelectric liquid crystal display.

16. An information processing apparatus having display with display image storage retention properties, comprising:

first memory means for storing original image data of a display image;

second memory means for storing data in a display format of said display;

monitor means for monitoring access to said first memory means;

conversion means for converting image data in a written area into a display data format of said display when write access to said first memory means is detected by said monitor means;

storage means for storing the converted image data in said second memory means;

determination means for determining whether a non-output image to said display is left in said second memory means; and output means for outputting non-output image to said display when said determination means determines that the non-output image is left in said second memory means.

17. The apparatus according to claim 16, wherein said second memory means has a capacity corresponding to a total size of a frame displayed on said display, and said display control apparatus further comprises second output means for outputting all images stored in said second memory means to said display when said determination means determines that no non-output image is left in said second memory means.

18. The apparatus according to claim 17, wherein said second output means performs interlaced scanning of an image stored in said second memory means and outputs the interlaced image to said display.

19. The apparatus according to claim 16, wherein said display is a ferroelectric liquid crystal display.

20. A display control apparatus having a display with display image storage retention properties, comprising:

first memory means for storing original image data of a display image;

second memory means for storing data in a display format of said display;

monitor means for monitoring access to said first memory means;

conversion means for converting image data in a written area into a display data format of said display when write access to said first memory means is detected by said monitor means;

storage means for storing the converted image data in said second memory means;

determination means for determining whether a non-output image to said display is left in said second memory means; and output means for outputting non-output image to said display when said determination means determines that the non-output image is left in said second memory means.

21. The apparatus according to claim 20, wherein said second memory means has a capacity corresponding to a total size of a frame displayed on said display, and said display control apparatus further comprises second output means for outputting all images stored in said second memory means to said display when said determination means determines that no non-output image left in said second memory means.

22. The apparatus according to claim 21, wherein said second output means performs interlaced scanning of an image stored in said second memory means and outputs the interlaced image to said display.

23. The apparatus according to claim 20, wherein said display control apparatus is connected to an expansion bus arranged in a general-purpose information processing apparatus.

24. The apparatus according to claim 20, wherein said display is a ferroelectric liquid crystal display.

25. A method controlling a display control apparatus for controlling a display having storage retention characteristics of a display image, comprising:

a monitor step of monitoring access to a first memory means for storing original image data of the display image;

a conversion step of converting image data in a written area into a display data format of the display when write access to the first memory means is detected in the monitor step;

a storage step of storing the converted image data in a display format of the display, in a second memory means;

a determination step of determining whether any non-output image to the display is left in the second memory means; and an output step of outputting non-output image when it is determined in the determination step that non-output image is present.

26. The method according to claim 25, wherein the second memory means has a capacity corresponding to a total size of a frame displayed on the display, and wherein said control method further comprises a second output step of outputting all images stored in the second memory means to the display when it is determined in said determination step that no non-output image is left in the second memory means.

27. The method according to claim 26, wherein the second output step comprises performing interlaced scanning of an image stored in the second memory means and outputting the interlaced image to the display.

28. The method according to claim 25, wherein the display control apparatus is connected to an expansion bus arranged in a general-purpose information processing apparatus.

29. The method according to claim 25, wherein the display is a ferroelectric liquid crystal display.

30. A recording medium storing code for causing an information processing apparatus to perform read access to a memory to control a display having storage retention characteristics of a display image, said code comprising:

a sequence code for a monitor step for monitoring access to a first memory means for storing original image data of the display image;

a sequence code for a conversion step of converting image data in a written area into a display data format of the display when write access to the first memory means is detected in the monitor step;

a sequence code for a storage step of storing the converted image data in a display format of the display, in a second memory means;

a sequence code for a determination step of determining whether any non-output image to a display is left in the second memory means; and a sequence code for an output step of outputting non-output image when it is determined in the determination step that the non-output image is present.

31. A display controller installed in a host computer, comprising:

data I/O means for connecting to the host computer;

first memory means for storing image data of a display image;

second memory means for storing data in a display format of a display;

input means for inputting image data from the host computer via said data I/O means and for storing the image data to said first memory means;

conversion means for converting the image data stored in said first memory means into a data format corresponding to said display and for outputting the converted data to said second memory means;

data transferring means for transferring the data stored in said second memory means to said display; and output means for outputting at least part of the data stored in said memory means to the host computer via said data I/O means.

32. The controller according to claim 31, wherein the data outputted by said output means is checked by the host computer.

33. The apparatus according to claim 31, wherein said display has storage retention characteristics of display contents.

34. The apparatus according to claim 33, wherein said display is a ferroelectric liquid crystal display.

* * * * *